United States Patent
Lamon et al.

(10) Patent No.: US 8,638,216 B2
(45) Date of Patent: Jan. 28, 2014

(54) SYSTEMS AND METHODS FOR DIRECT CURRENT SYSTEM DIGITAL CARRIED MESSAGE CONVEYANCE

(76) Inventors: Keith Lamon, Ixonia, WI (US); Brad Rake, Hubertus, WI (US)

( * ) Notice: Subject to any disclaimer, the term of this patent is extended or adjusted under 35 U.S.C. 154(b) by 435 days.

(21) Appl. No.: 12/975,728

(22) Filed: Dec. 22, 2010

(65) Prior Publication Data

US 2011/0150126 A1   Jun. 23, 2011

Related U.S. Application Data

(63) Continuation-in-part of application No. 12/001,123, filed on Dec. 10, 2007, now Pat. No. 7,859,397, which is a continuation-in-part of application No. 11/227,376, filed on Sep. 15, 2005, now Pat. No. 7,307,520.

(60) Provisional application No. 60/611,235, filed on Sep. 17, 2004.

(51) Int. Cl.
    *B60Q 1/00*   (2006.01)
(52) U.S. Cl.
    USPC .................. 340/538; 340/538.12; 340/310.13
(58) Field of Classification Search
    USPC ............. 340/310.11, 310.13, 310.14, 310.15, 340/538, 538.12, 538.14, 538.15, 538.16, 340/12.32, 12.33, 12.37; 713/300, 340; 726/36
    See application file for complete search history.

(56) References Cited

U.S. PATENT DOCUMENTS

| | | | |
|---|---|---|---|
| 4,523,307 A | 6/1985 | Brown et al. | |
| 4,639,609 A | 1/1987 | Floyd et al. | |
| 4,749,992 A | 6/1988 | Fitzemeyer et al. | |
| 5,040,168 A | 8/1991 | Maue et al. | |
| 5,142,278 A | 8/1992 | Moallemi et al. | |
| 5,488,352 A | 1/1996 | Jasper | |
| 5,694,109 A | 12/1997 | Nguyen | |
| 5,727,025 A | 3/1998 | Maryanka | |
| 5,739,592 A | 4/1998 | Rigsby et al. | |
| 5,745,027 A | 4/1998 | Malville | |
| 5,812,557 A | 9/1998 | Stewart et al. | |
| 5,818,821 A * | 10/1998 | Schurig ......................... | 370/293 |
| 5,900,803 A | 5/1999 | Politz et al. | |

(Continued)

FOREIGN PATENT DOCUMENTS

| | | |
|---|---|---|
| EP | 0 659 613 | 5/1995 |
| EP | 1 383 280 | 1/2004 |

(Continued)

OTHER PUBLICATIONS

Office Action dated Aug. 29, 2006 regarding U.S. Appl. No. 11/227,376, 10 pages.

(Continued)

*Primary Examiner* — Van T. Trieu

(74) *Attorney, Agent, or Firm* — Ryan Kromholz & Manion, S.C.

(57) ABSTRACT

The systems and methods of the present invention provide for conductive emissions communication without requiring dedicated communications wires. The systems and methods have the capability to send digital messages over the same wires that are used to power DC systems. Hardware filter circuits are combined with advanced algorithms in a communications control chip to permit the elimination of the dedicated wires, thereby needing zero additional wires to accomplish the task of digital control.

12 Claims, 22 Drawing Sheets

(56) References Cited

U.S. PATENT DOCUMENTS

| | | |
|---|---|---|
| 6,006,143 A | 12/1999 | Bartel et al. |
| 6,127,939 A | 10/2000 | Lesesky et al. |
| 6,229,432 B1 | 5/2001 | Fridley et al. |
| 6,229,434 B1 | 5/2001 | Knapp et al. |
| 6,356,426 B1 | 3/2002 | Dougherty |
| 6,373,377 B1 | 4/2002 | Sacca et al. |
| 6,392,368 B1 | 5/2002 | Deller et al. |
| 6,393,064 B1 | 5/2002 | Nagai et al. |
| 6,400,103 B1 | 6/2002 | Adamson |
| 6,411,203 B1 | 6/2002 | Lesesky et al. |
| 6,434,459 B2 | 8/2002 | Wong et al. |
| 6,453,687 B2 * | 9/2002 | Sharood et al. ............ 62/127 |
| 6,507,158 B1 | 1/2003 | Wang |
| 6,512,307 B1 | 1/2003 | Ilg |
| 6,608,554 B2 | 8/2003 | Lesesky et al. |
| 6,629,032 B2 | 9/2003 | Akiyama |
| 6,731,201 B1 * | 5/2004 | Bailey et al. ............ 340/12.32 |
| 6,744,352 B2 | 6/2004 | Lesesky et al. |
| 6,759,946 B2 | 7/2004 | Sahinoglu et al. |
| 6,799,814 B2 | 10/2004 | Lesesky et al. |
| 6,800,957 B2 | 10/2004 | Nerone et al. |
| 6,842,108 B2 | 1/2005 | Akiyama et al. |
| 6,842,668 B2 | 1/2005 | Carson et al. |
| 6,934,862 B2 * | 8/2005 | Sharood et al. ............ 713/300 |
| 6,970,772 B2 | 11/2005 | Radtke et al. |
| 7,010,050 B2 | 3/2006 | Maryanka |
| 7,042,339 B2 | 5/2006 | Bruccoleri et al. |
| 7,286,044 B2 | 10/2007 | Yanagida et al. |
| 7,307,520 B2 | 12/2007 | Lamon et al. |
| 7,741,960 B1 | 6/2010 | Hoogenakker et al. |
| 7,852,206 B2 | 12/2010 | Yanagida et al. |
| 8,154,153 B2 | 4/2012 | Yang et al. |
| 8,442,127 B2 | 5/2013 | Stadelmeier et al. |
| 8,527,135 B2 | 9/2013 | Lowrey et al. |
| 8,541,903 B2 | 9/2013 | Burk |
| 2003/0076221 A1 | 4/2003 | Akiyama et al. |

FOREIGN PATENT DOCUMENTS

| | | |
|---|---|---|
| JP | 2005123960 | 5/2005 |
| WO | WO 02/052745 | 7/2002 |
| WO | WO 2004/055994 | 7/2004 |

OTHER PUBLICATIONS

Office Action dated May 8, 2007 regarding U.S. Appl. No. 11/227,376, 8 pages.

Office Action dated Feb. 18, 2010 regarding U.S. Appl. No. 12/001,123, 7 pages.

* cited by examiner

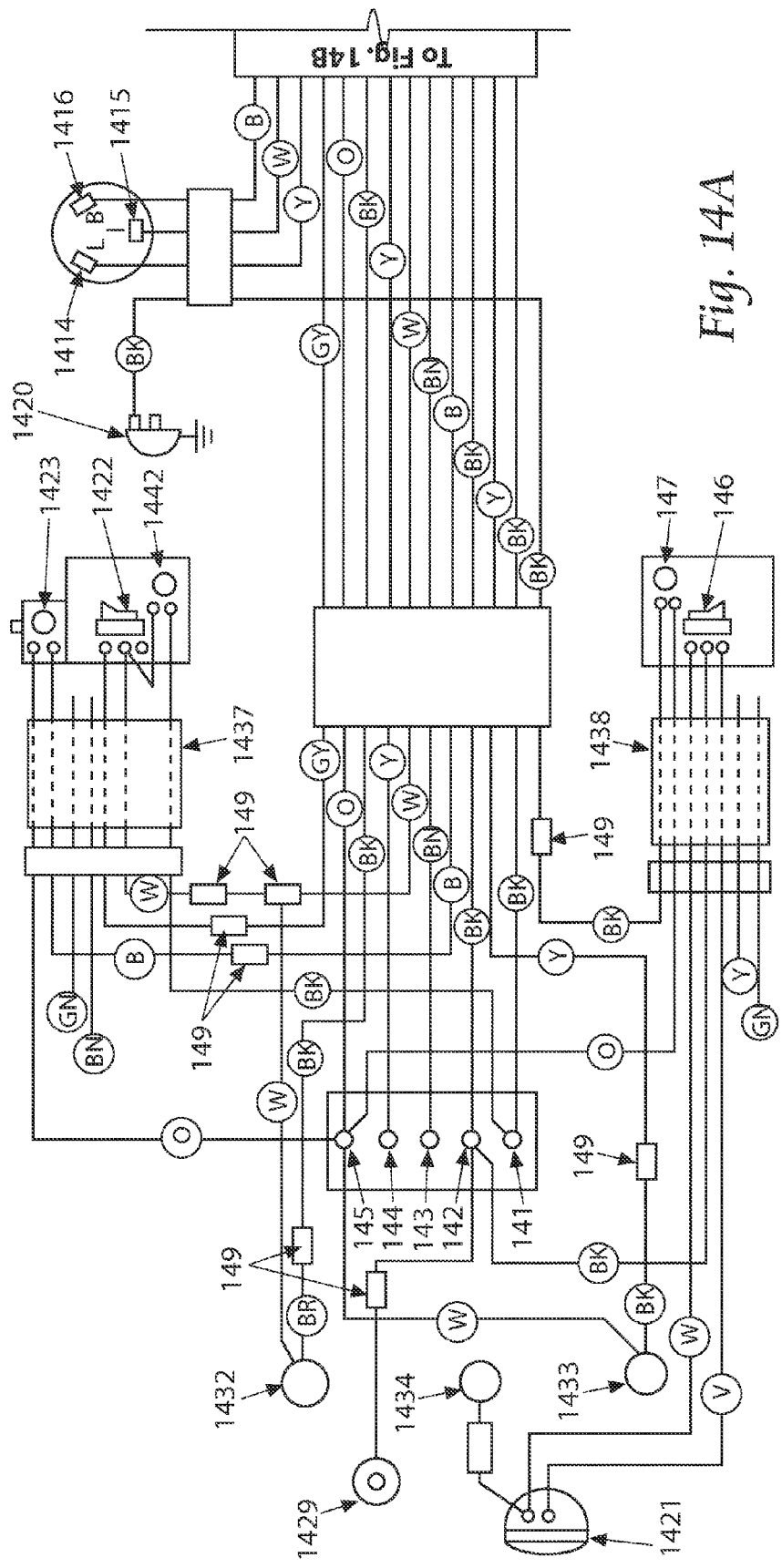

SYSTEMS AND METHODS FOR DIRECT CURRENT SYSTEM DIGITAL CARRIED MESSAGE CONVEYANCE

RELATED APPLICATIONS

This application is a continuation-in-part of U.S. application Ser. No. 12/001,123, filed on 10 Dec. 2007, now U.S. Pat. No. 7,859,397, which is a continuation-in-part of application U.S. Ser. No. 11/227,376, filed on 15 Sep. 2005, now U.S. Pat. No. 7,307,520 which claims the benefit of U.S. Provisional Patent Application Ser. No. 60/611,235, filed 17 Sep. 2004, and entitled "Systems and Methods for Direct Current System Digital Carried Message Conveyance."

FIELD OF THE INVENTION

This invention relates generally to digital communication systems. In particular, this invention relates to direct current conductive emissions communications systems.

BACKGROUND OF THE INVENTION

Many forms of digital communications used today require separate wires to carry the digital messages from one place to another. The only exception to this trend is RF (Radio Frequency) based systems. Systems employing RF technology transmit a radio signal through the air in the same manner as a cellular phone.

When a non-RF system uses dedicated wires for communications, those wires are often referred to collectively as the "communications bus." A communications bus refers to a group of wires whose responsibility it is to get information from the source to the intended receiver or from the receiver to the source. The reason that is done is to denote the fact that those wires are acting as a stand-alone sub-system and must be isolated from other sub-systems. In more complex systems it is possible to have several communications buses. This would become necessary if the different communications sub-systems were incompatible and the digital information being conveyed by one sub-system would interfere with the operation of another sub-system.

FIG. 1 is an illustration of a simple prior art communications bus system that might be encountered in a mobile DC (Direct Current) application. This type of system is referred to as using conducted signals or emissions. This means the signal itself is following a conductive path, e.g., a conductive wire of the communications bus. This results in a more controlled message path, a message that can work at low power levels and reduced chances of the signal interfering with other electronic devices.

Conducted emission systems to date have had one distinct disadvantage. A conductive path can also carry many types of noise. This noise can come from many sources. Examples would be a motor, solenoid, generator or certain types of lights. Radiated emissions of sufficient power can also attach themselves to a conductive path.

One prior art type of communications method that is gaining in popularity is the Radio Frequency (RF) system, as shown in FIG. 2. As explained previously, this works in much the same manner as a cellular phone.

RF systems use what is referred to as a radiated transmission or emission. That type of signal is intentionally transmitted into the air surrounding an antenna in all directions. Radiated emission devices are tightly controlled by the FCC (Federal Communications Commission) due to their tendency to interfere with other electronic devices. Conventional RF devices must transmit within well-defined ranges of frequencies that have been established by the FCC. Most of the FCC frequencies require a license to operate a transmitting device. There are specific frequencies set aside for low power devices such as the ones used in the RF devices currently being discussed. These devices collectively are sometimes referred to as "Part 15" devices as that is the section of the FCC rules they operate within.

To initiate a RF system, an input device receives information from a pre-determined source. This could vary from a sensor monitoring a certain parameter to a switch sending a "go" or "stop" command. Once the incoming information is recognized, the input controller generates a message for transmission. The input controller would then broadcast that coded message through the air to all other controllers in the system. One disadvantage to this scheme is that any electronic device capable of receiving air-born messages and in close proximity to the transmitting device would also receive the message.

In order to minimize the possibility of an unintended device responding to an incoming message the originating controller would encode the message with a special recognition number. To further reduce the possibility of miscommunication, some systems employ what is referred to as a Spread Spectrum Frequency Hopping communications scheme. What that means is that instead of broadcasting on only one frequency, the controller sends out portions of its message on different frequencies. The receiving device must be directed to know what frequency to start at and what other frequencies to hop to as the incoming message progresses.

The need remains for simplified digital communication systems and methods that do not require dedicated communications wires and that send digital messages over the same wires that are used to power DC systems.

SUMMARY OF THE INVENTION

It is an object of this invention to provide digital communication systems and methods that do not require dedicated communications wires.

It is also an object of this invention to provide systems and methods that send digital messages over the same wires that are used to power DC systems, thereby eliminating the dedicated wires and requiring zero additional wires to accomplish the task of digital control.

These and other objects of the invention are achieved by providing a communications system comprising an input device and an output device. The input device is coupled to a power source of the load power bus. The output device is coupled to the input device and to a load by the load power bus and to the power source by a return power bus. The output device comprises a filter, a receive detector, a controller, a transmit driver, and a main processor.

The filter receives a command signal of a pre-determined frequency transmitted by the input device over the load power bus and filters signals that are not of the pre-determined frequency. The receive detector receives signals from the filter and determines if the signals match the pre-determined frequency and outputs a signal of the pre-determined frequency corresponding to the command. The controller receives the command from the receive detector and processes the command in serial code. The transmit driver is located downstream of the controller and prepares messages received from the controller for injection back into the load power bus. The main processor receives the message from the controller.

According to one aspect of the invention, the system is a direct current (DC) system.

According to another aspect of the invention, the machine code comprises a group of three Bytes.

Objects of the invention are also achieved by providing a conductive emissions communications system comprising an input device, an output device communicatively coupled to the input device by a power line, a load controlled by the output device, and means for transmitting a command signal from the input device to the output device over the power line without the use of a designated communications line. The output device includes means for recognizing the command signal transmitted by the input device, means for filtering interfering signals, and means for controlling the load based on the command signal without the interfering signals.

According to one aspect of the invention, the system is a direct current (DC) system.

According to another aspect of the invention, the output device includes means for processing the command signal in serial code.

Objects of the invention are also achieved by a method of transmitting a digital communication comprising transmitting a command signal directly over a power line from an input device, through an output device, and to a load without the use of a designated communications line.

According to one aspect of the invention, the power line is part of a direct current (DC) system.

According to another aspect of the invention, the output device includes means for processing the command signal's serial code.

According to another aspect of the invention, interfering signals are filtered from the command signal.

According to another aspect of the invention, a system for receiving command input from a human user, such as a policeman activating squad car lights, is received and processed. The command input can then be input into a main input module, and transmitted over a power line with the power, and into an output module, a controller and to various electrical loads. In this manner, existing controllers that are associated with the command sequences of emergency lights on police cars (for instance), can be used in association with an output module to transmit control and power over power lines to input modules in order to simplify vehicle wiring.

DESCRIPTION OF THE DRAWINGS

FIGS. 14a and 14b; and 15a and 15b; are schematic wiring diagrams of a prior art wiring system as applied to a motorcycle and the wiring method of the present invention as applied to a motorcycle, respectively.

DESCRIPTION OF THE PREFERRED EMBODIMENT

Figure 1:
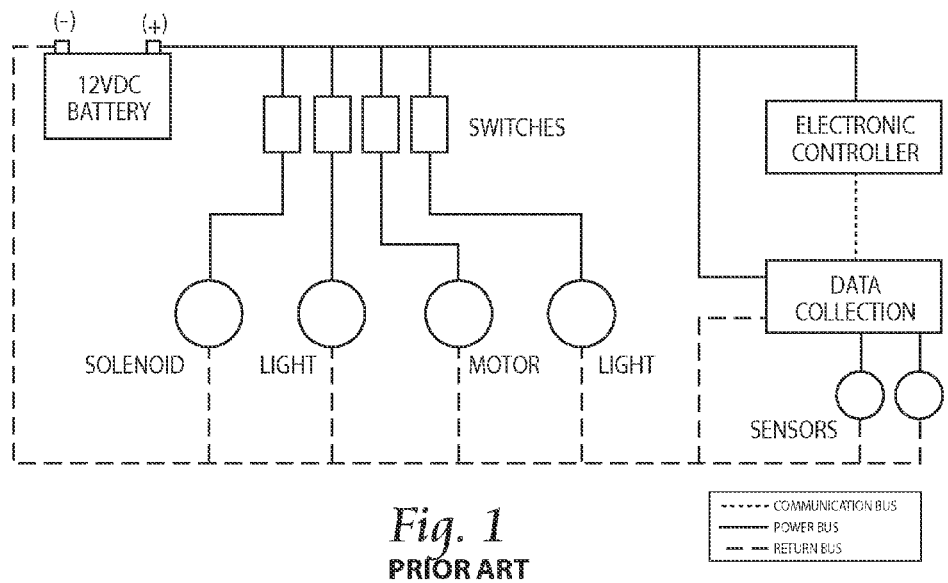
FIG. 1 is a schematic drawing of a prior art conductive emissions communications system having a dedicated communications bus for transmitting a signal.
Figure 2:
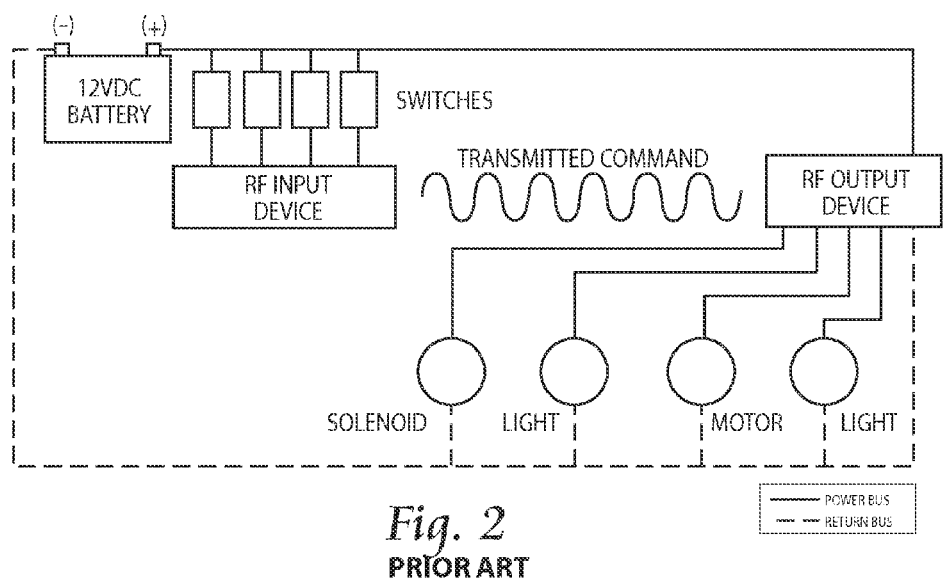
FIG. 2 is a schematic drawing of a prior art radio frequency communications system.

Although the disclosure hereof is detailed and exact to enable those skilled in the art to practice the invention, the physical embodiments herein disclosed merely exemplify the invention, which may be embodied in other specific structures. While the preferred embodiment has been described, the details may be changed without departing from the invention.

It is useful for the purposes of this disclosure to have an understanding of terms commonly used in reference to communications systems.

Serial or Parallel refers to the way in which the information is sent out. In a parallel system, different parts of a message stream are sent over different wires. Computer printers to this day still use a parallel communications scheme. These types of systems can transmit at very high speeds but require many more wires to accomplish the task. In a serial scheme, all of the data is sent out in one stream, one part of the message stacked behind the other. This results in processing at slower speeds but using much fewer wires.

Baud rate is the same as the term bps (Bits Per Second). The term baud rate applies to an analog system (i.e., a modem or phone line based system). The term bps refers to a digital system.

Twisted pair wires is a term used to describe a method of reducing the influence of external electrical noise on two wires. When you twist two wires together, the strength of the noise riding on the wires tends to be lessened, or attenuated, where the lines cross each other. This is a less expensive way of trying to eliminate noise as opposed to shielded cable. With shielded cable, a conductive foil wrap actually surrounds the wires and is also wrapped over a bare conductor. The bare conductor acts as a drain for the foil shield when one of its ends is connected to ground.

Synchronous is a term used to describe when a communications system is controlled by a timing clock. If the system is asynchronous a clock does not control it. The systems and methods of the present invention are preferably synchronous.

Bi-directional means the system can send messages in both directions as opposed to uni-directional. The systems and methods of the present invention are preferably bi-directional.

Master-Slave or Peer to Peer. These two terms describe whether a system has one controller that is responsible for the control of a communications system (Master-Slave) or if each controller (processor) can access the system (Peer to Peer).

I. System Overview

In reality all systems in use today, RF or otherwise, attempt to achieve two things: 1) to reduce the number of wires required activating a load of some sort; and 2) moving digital information.

An RF system uses a radio message transmitted from an input module to tell a receiver output module what needs to be done or what information is being passed. This in essence, replaces the dedicated communication wires that used to run from the control device, such as a switch, to the controlled load or from one controller to another.

Figure 3:
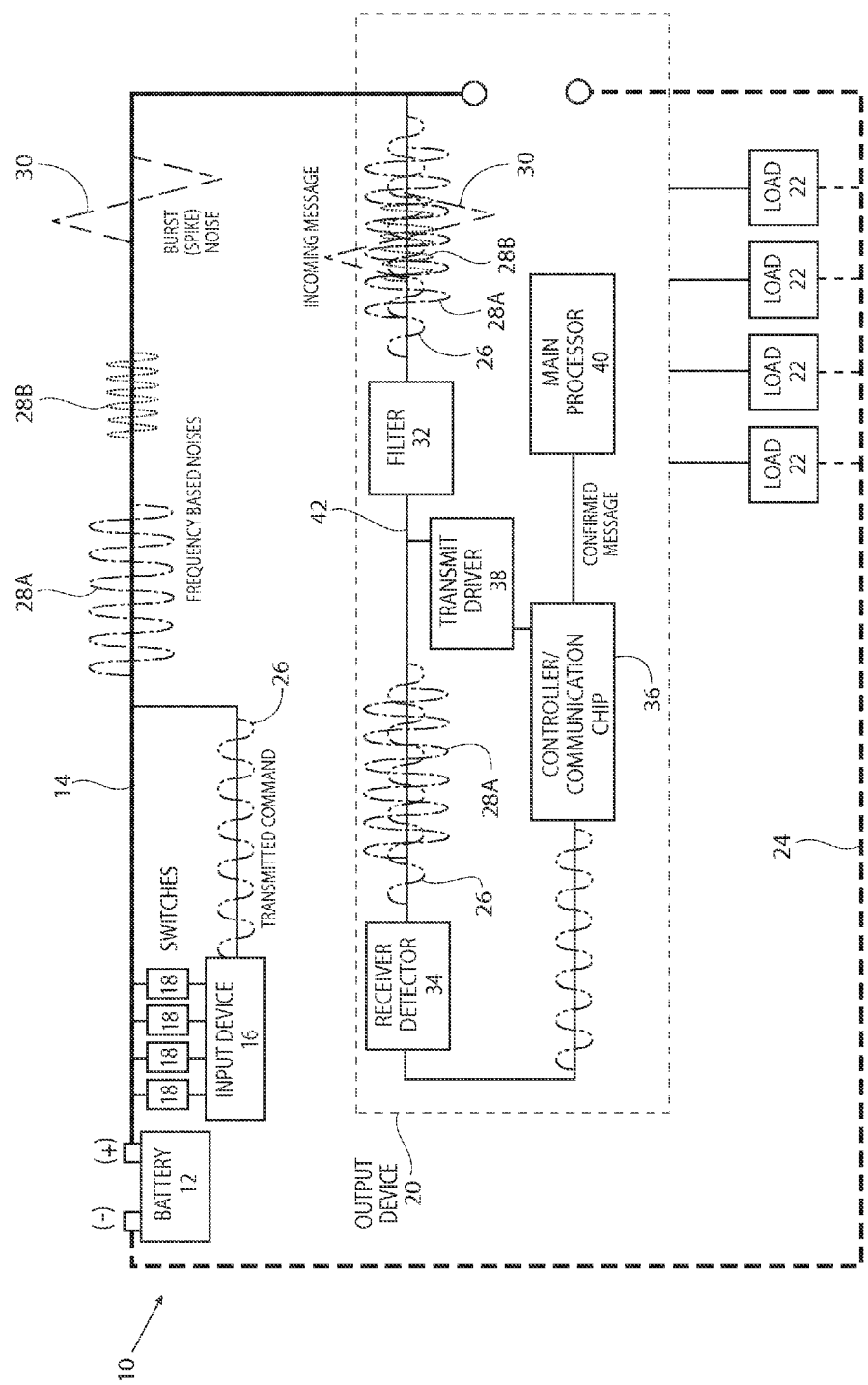
FIG. 3 is a schematic drawing of a conductive emissions communications system that permits transmission of a command signal directly over a power bus.

FIG. 3 illustrates a conductive emissions communications system 10 that also replaces those same wires and sends information, thereby eliminating the need for dedicated communication bus wires.

The system 10 includes a power source, e.g., a conventional direct current (DC) 12-volt battery 12. A load power bus 14 provides voltage and current from the battery 12 to an input device 16 (by way of a series of switches 18), to an output device 20, and from the output device 20 to one or more loads 22. By way of illustration, in an automobile, a load 22 may take the form of a light, a motor, a horn, a solenoid, or any other component requiring activation and/or deactivation. A return bus 24 provides voltage and power back to the battery 12 from the output device 20.

Instead of transmitting a signal through the air like a RF system, the system 10 injects a message or transmitted command 26 directly onto the load power bus 14. That is, the power handling capability of the power bus 14 is multiplexed in combination with signal transmission. The power and return buses 14 and 24 define a two-conductor cable (e.g., black and red) system. Instead of a bundled harness for each command, only the power 14 and return 24 cables are required. As only two cables need to be checked/verified or replaced, troubleshooting and diagnostics are greatly simplified.

As was discussed earlier, a conductive emissions communications system is more apt to be affected by electrical noise from other devices. One common type of noise is spurious frequency noise. Two different spurious frequency noises, denoted 28A and 28B to designate different frequencies, are shown in FIG. 3. Burst noise 30 is normally classified as non-cyclical momentary electrical voltage deviations (positive or negative) and are often referred to as spikes.

The output device includes a filter 32, a receive detector 34, a controller 36 (e.g., communications chip), a transmit driver 38, and a main processor 40, which communicate by way of a power line 42, which run in parallel to the power line 42, thus eliminating bulky series filter elements. Together, these components enable the system 10 to withstand the burst 30 and spurious frequency noises 28A and 28B normally associated with low voltage DC systems.

A first group of cooperating components form the filter 32, which may be connected via a capacitor to the power line 42. The filter 32 acts to block signals that are not of a desired or proper frequency or that otherwise do not match pre-determined criteria. The filter 32 is preferably designed to work at a Center Frequency of 1.79 MHz. The Center Frequency is the midpoint of the range of frequencies, or bandwidth, that a filter will pass. This is equal to 1,790,000 Hertz or cycles per second. In a preferred embodiment, the filter 32 is an arrangement of various components commonly used in filter circuits and available from many manufacturers.

A second group of cooperating components form the receive detect network 34. The network 34 monitors signals that have passed through the filter 32 to determine if they match the desired frequency.

A third group of cooperating components form the transmit driver 38. The driver 38 prepares messages from the controller 36 for injection onto the power line 42. In the illustrated and preferred embodiment, the driver 38 is located on the downstream side of the controller 36. After an outgoing signal has passed through the controller 36, it is sent back through the filter 32 and onto the power line 14 as verification of receipt and transmission of the command signal 26.

The controller 36 contains the software that determines if the signal sent through the receive detector 34 is valid. If it is a valid signal, the information will be decoded and stored in a message buffer. The main processor 40 is then notified that a new message has come in.

The controller 36 utilizes a communications processor chip along with a specialized circuit board design that minimizes interference found in low voltage DC circuits. In a preferred embodiment, the controller 36 is a very large-scale integration (VLSI) device, such as model QDC10 available from Yamar Electronic, Ltd., of Tel Aviv, Israel.

The controller 36 and processor 40 use advanced algorithms to decode and process the command 26. All computers are nothing more than a group of switches. These switches can only be either on or off. That being the case there are only two electrical voltage conditions that can exist, energized (Hi) or de-energized (Low).

This means that any computer or digital device must communicate in a binary language. A binary language has two characters to work with and the characters are typically 0 (Electrically Low) or 1 (Electrically Hi). No matter how complicated a device may be, it still works with a simple binary language. Binary language is also known as machine code.

Processors can only work with a fixed number of 1's and 0's at a time. For many years, processors used blocks of 8 characters of 1's or 0's. An individual 1 or 0 is called a Bit. A collection of 8 bits is called a Byte, 4 bits is called a Half Byte. 16 bits is known as a Word and 32 bits is referred to as a Double Word. In recent years, processors have progressed to the point where it possible to rapidly manipulate 16 bits or 32 bits at a time.

Software in each independent electronic module communicates to other modules in a typical system using synchronous (clocked) serial messages. The communications network is bi-directional (sends and receives) in nature. Messages are constructed using a unique "group number" approach. One byte in each message is reserved for a group number. As all messages are broadcast to every module in a system, the group number tells each module if a particular message is meant for that module. The number also prequalifies a message for internal processing by the intended recipient. The system format is a combination of Peer-to-Peer and Master-Slave. As with a typical Peer-to-Peer system, each module can transmit a message without direction from the Master. To help prevent collisions on the communications network, each module is assigned a transmit slot number. When a module has a message to send, it must wait for its slot number to come up. The timing for the transmit slot is controlled by an internal timer built into each module. The Master polls the other modules in the system and can override any modules' command in the event of a fault situation.

The illustrated system 10 uses a group of 3 Bytes or 24 Bits of binary information.

Example of possible message of the systems and methods of the present invention:

| Byte 1 | | | | | | | |
|---|---|---|---|---|---|---|---|
| 1 | 1 | 1 | 1 | 1 | 1 | 1 | 0 |

Prepare to transmit 3 Byte long message

| Byte 2 | | | | | | | |
|---|---|---|---|---|---|---|---|
| 0 | 0 | 0 | 0 | 0 | 0 | 1 | 0 |

Message is for Group 2 (On/Off function)

| Byte 3 | | | | | | | |
|---|---|---|---|---|---|---|---|
| 0 | 0 | 0 | 0 | 0 | 0 | 0 | 1 |

Turn "On" Group 2 function

The Group format method of message construction not only allows the systems and methods of the present invention to transmit complex messages with a minimum number of Bytes, it also allows for expansion and flexibility beyond the limitations of other message construction techniques.

When a message is sent out it has to have a specific target. Normally, this is accomplished by assigning a unique address to each potential target. This is very limiting however, if one of the goals of the system is to keep message length (total number of Bytes) to a minimum.

The Group format expands the capabilities of a single Byte of information by accounting for the normally encountered redundancies in most applications. Instead of assigning a specific address to each target, groups are formed of targets that always respond together to a specific command.

For example, in an automotive application, both headlights are normally turned on or off at the same time. Instead of targeting a message to each headlight, they can be grouped together so that one group command can operate both headlights. If an operator wishes to turn on only one headlight, the same group number can be used, but the command is changed to turn on only one headlight.

As another example, in many hydraulic applications it becomes necessary to activate multiple valves simultaneously. An operator may use the Group format and simply assign each valve grouping a separate group number. If there were a particular valve that is a member of multiple groups, then the processor output terminal for that valve would be assigned all of the group numbers required.

The software permits a variety of customized functions to be programmed. For example, lights can be programmed to be flashers or multiple motors may be simultaneously activated to allow a car seat to move forward and up at the same time with one switch. Customized safety features may also be programmed, e.g., to require a designated function or pass code before a switch can be activated. Diagnostics software greatly simplifies troubleshooting. For example, diagnostic functions can monitor loads and broadcast fault conditions to aid in diagnosing short conditions.

If increased communication speed is necessary, an additional small processor (not shown) may be provided to act as a buffer between the communications chip 36 and the main processor 40. The additional processor would desirably monitor the communications chip 36, store new messages, and transfer messages between the main processor 40 and the communications chip 36.

II. Use of the System

In use, an operator uses switches 18 to input a selected function into the input device 16. The input device 16 transmits the command 26 corresponding to the selected function onto the load power bus 14 for transmission to the output device 20. The command 26 is a signal transmitted as a pre-determined frequency or frequencies. As FIG. 3 illustrates, frequency-based noises 28A/28B and burst noise 30 may also be present on the load power bus 14 along with the desired command 26 to the controller 20 and thereby mask, disrupt, or otherwise interfere with the command signal 26.

The filter 32 receives the command 26 as transmitted by the input device 16 and filters interfering signals that are not of the pre-determined frequency. The filter 32 then transmits the "filtered" signals to the receive detector 34. In some cases, the filter 32 may not be able to remove all interfering noises. For example, FIG. 3 illustrates a situation in which the filter 32 has removed the burst noise 30 and frequency-based noise 28B. However, the filtered signals still retain frequency-based noise 28A along with the command signal 26.

The receive detector 34 receives the signals from the filter 32 and determines if the signals match the pre-determined frequency corresponding to the command signal 26. In the illustrated example, the receive detector 34 recognizes that the noise 28B does not correspond to any pre-determined frequency and disregards the noise signal 28B. The receive detector also recognizes the command signal 26 as corresponding to a pre-determined frequency and outputs the command 26 to the controller 36.

The controller 36 receives the command 26 from the receive detector 34 and decodes and processes the command 26 in binary language comprising a Group of three Bytes, as previously described. The controller 36 then transmits the confirmed message to the main processor 40.

III. Representative Applications

One of the significant features of the systems and methods of the present invention is the relative ease of custom configuration for varied applications in multiple markets. The systems and methods of the present invention are built on a modular design platform so many applications can be accomplished with minimal development time. The system 10 is inherently reliable through the utilization of commonly used components.

Automotive:

Mainstream: At the time of manufacturing, vehicles may be equipped by the manufacturer with individual controls and indicators for security systems, interior & exterior lights, sound & video systems, climate control, and various options available on the vehicle.

Aftermarket: Available in standard modules, customers (e.g., car rebuild shops, actual end-users) may purchase the modules they need for their specific requirements. Modules would be designed to interface with aftermarket "kits" so that features like electric windows, security systems and custom lighting could be easily added to older vehicles. Modules would also interface with aftermarket or original equipment monitoring and control systems.

Figure 4:
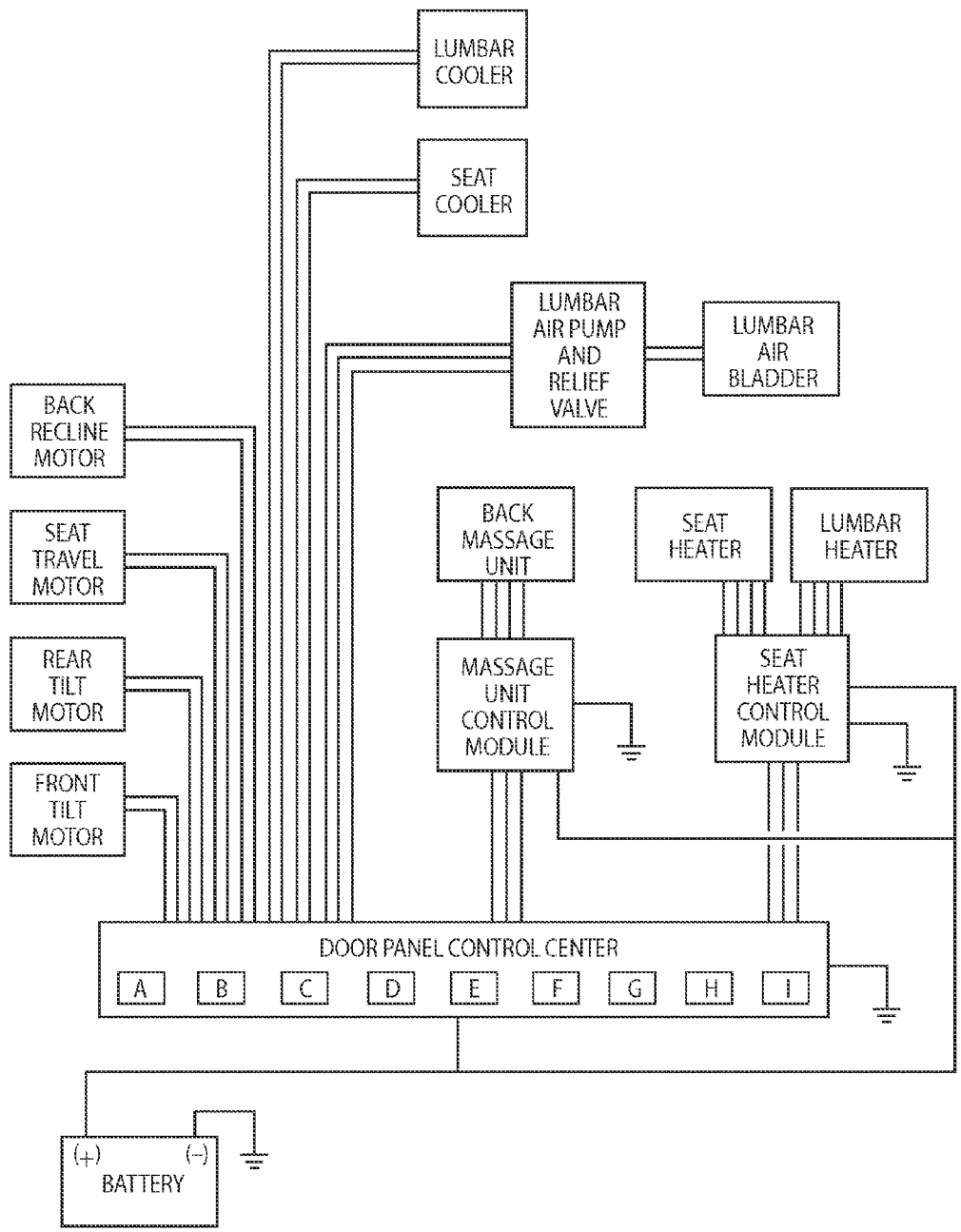
FIG. 4 is a schematic drawing of a prior art automobile seat control wiring system.
Figure 5:
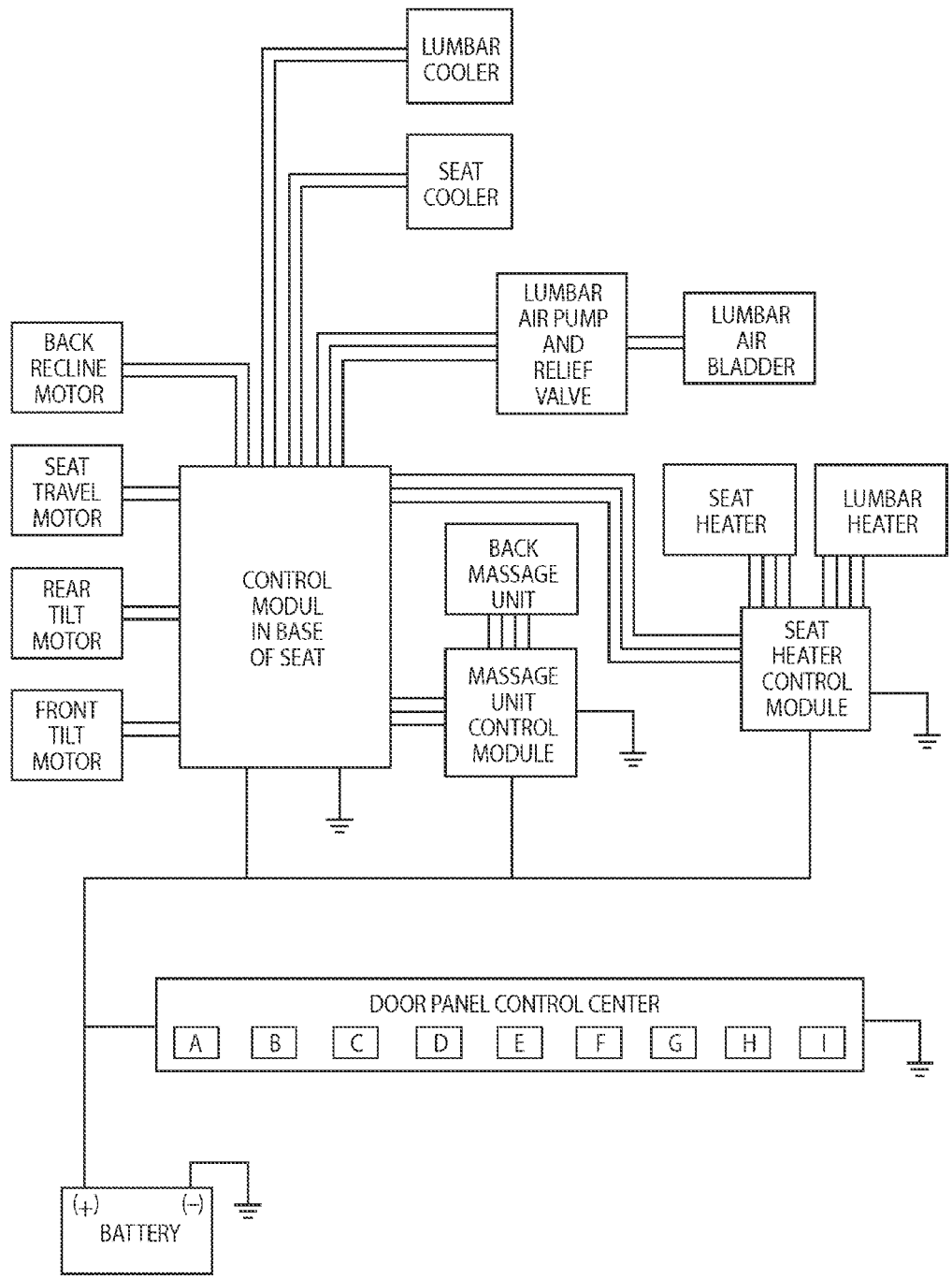
FIG. 5 is a schematic drawing of an automobile seat control wiring system using the system shown FIG. 3.

FIGS. 4 and 5 are illustrative embodiments of automobile seat control wiring. FIG. 4 illustrates a conventional prior art system employing a multiplicity of additional dedicated wires. Referring to FIGS. 4 and 5, on the door panel control center is typically provided Back Recline Switch A, Seat Forward/Back and Seat Up/Down B, Front Tilt Switch C, Rear Tilt Switch D, Lumbar/Seat Heater Switch E, Lumbar Heater High/Low Heat Switch F, Lumbar Air Bladder Switch G, Lumbar/Seat Cooler Switch H, and Massage Motion Switch I. FIG. 5 illustrates use of the system 10 of the present invention to eliminate the need for interconnecting load control wires. In the embodiment illustrated in FIG. 5, the control module serves as the output device 20 and the door panel control center serves as the input device 16. The system 10 may also be interfaced with DVD, Stereo/Radio, and security systems.

Figure 6:
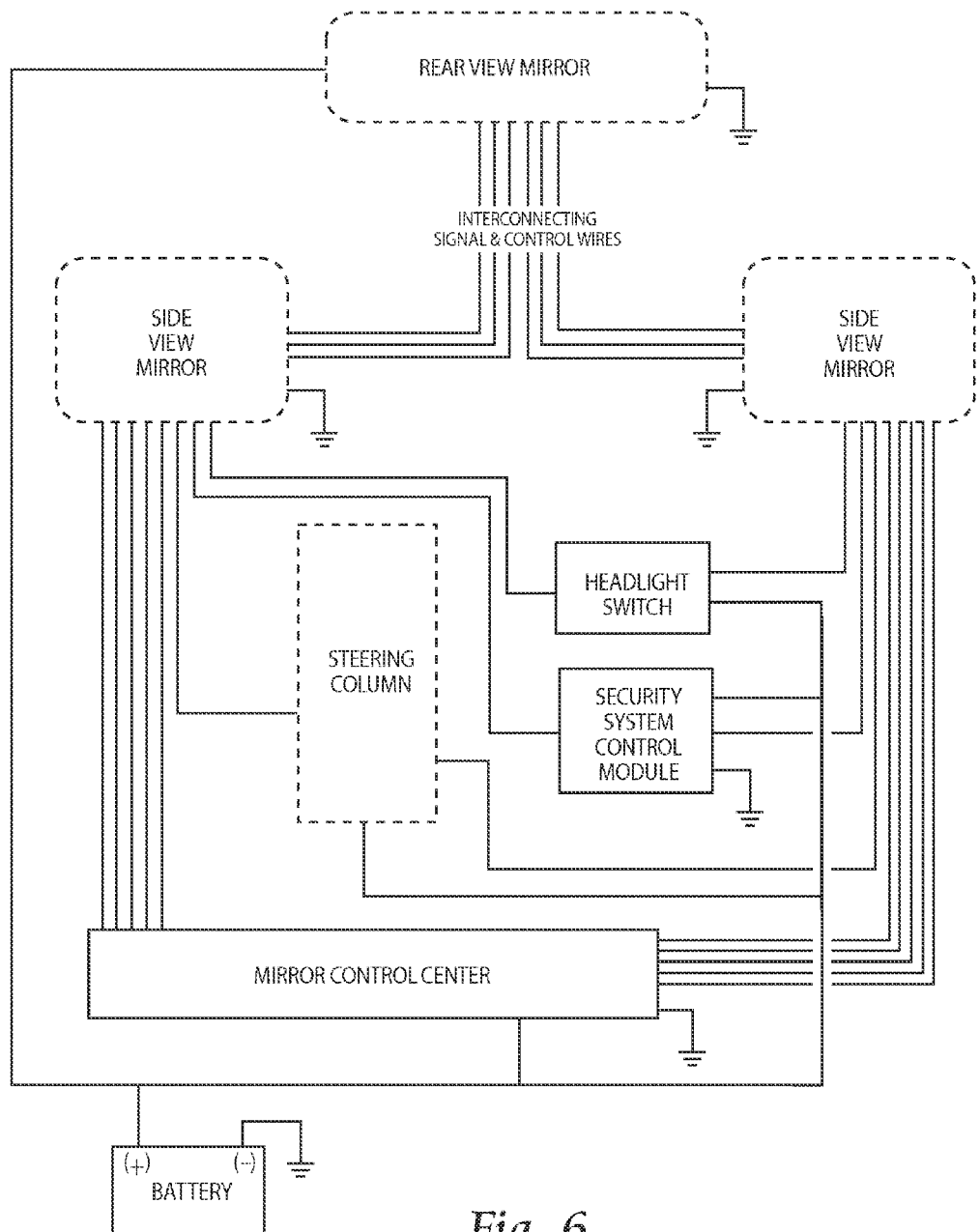
FIG. 6 is a schematic drawing of a prior art automobile mirror control wiring system.
Figure 7:
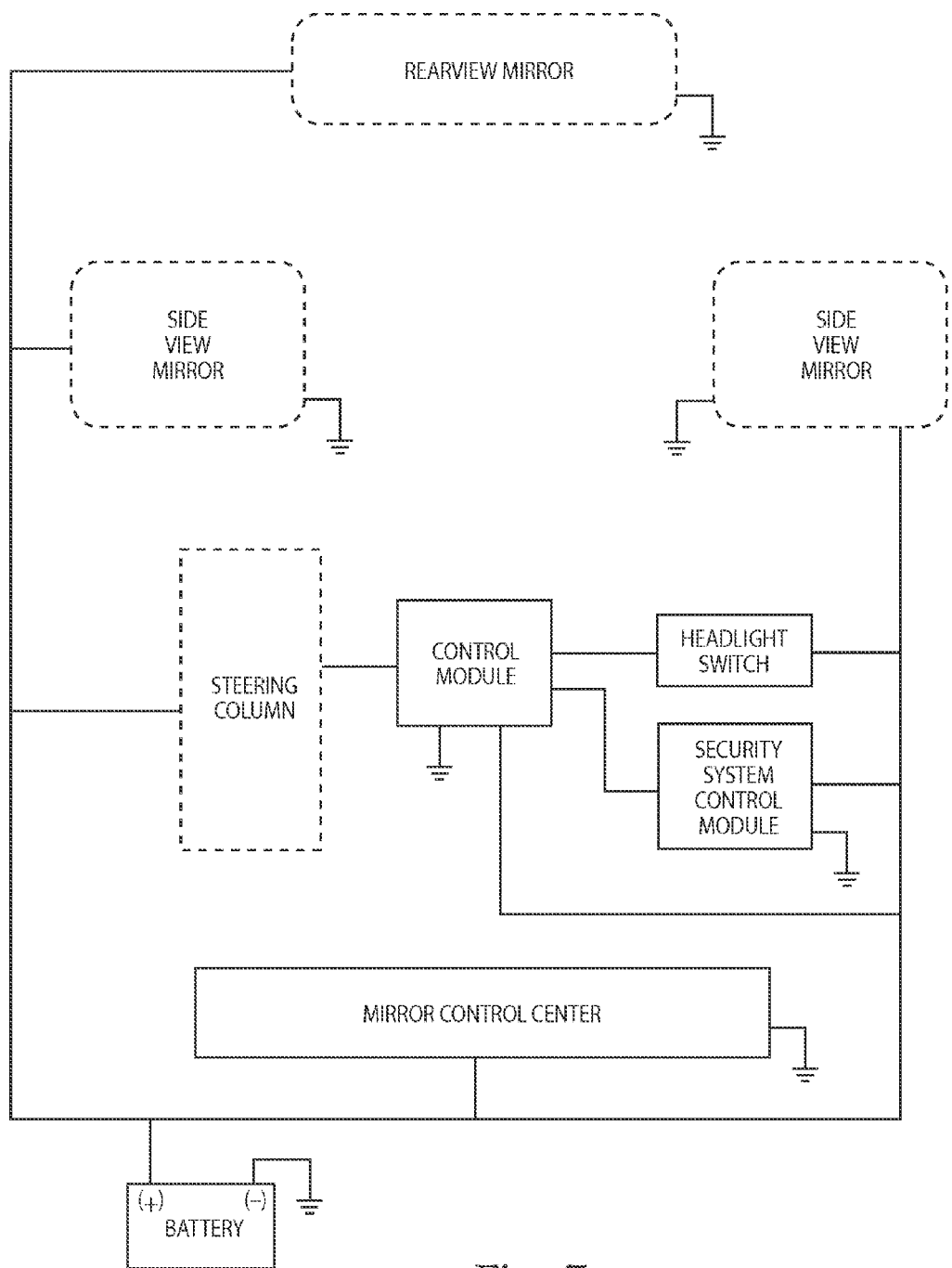
FIG. 7 is a schematic drawing of an automobile mirror control wiring system using the system shown FIG. 3.

FIGS. 6 and 7 are illustrative embodiments of automobile mirror control wiring. FIG. 6 illustrates a conventional prior art system employing a multiplicity of additional dedicated wires. FIG. 7 illustrates use of the system 10 of the present invention to eliminate the need for interconnecting load wires. The control module serves as the output device 20 and the mirror control center serves as the input device 16.

Figure 8:
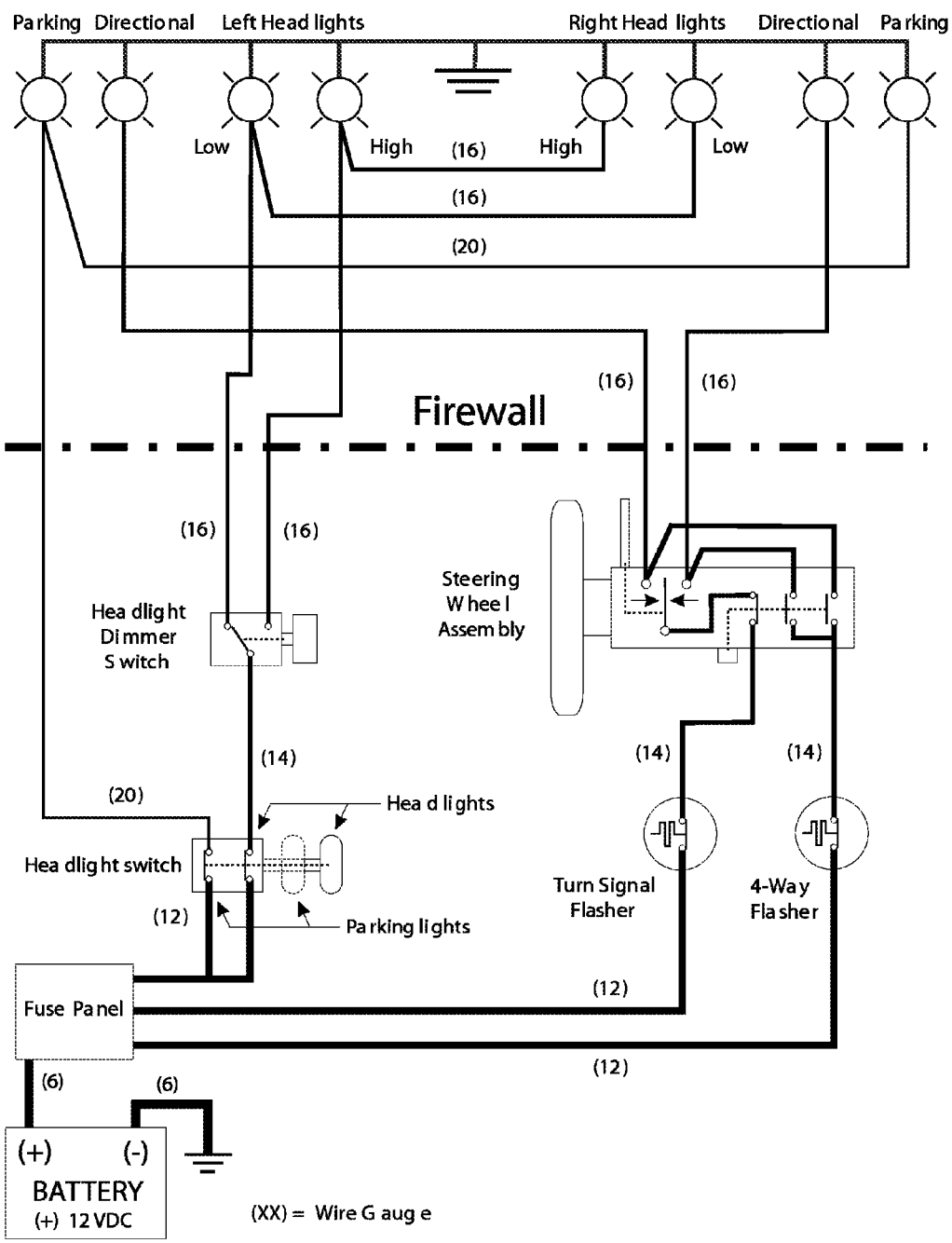
FIG. 8 is a schematic of a prior art vehicle wiring system.
Figure 9:
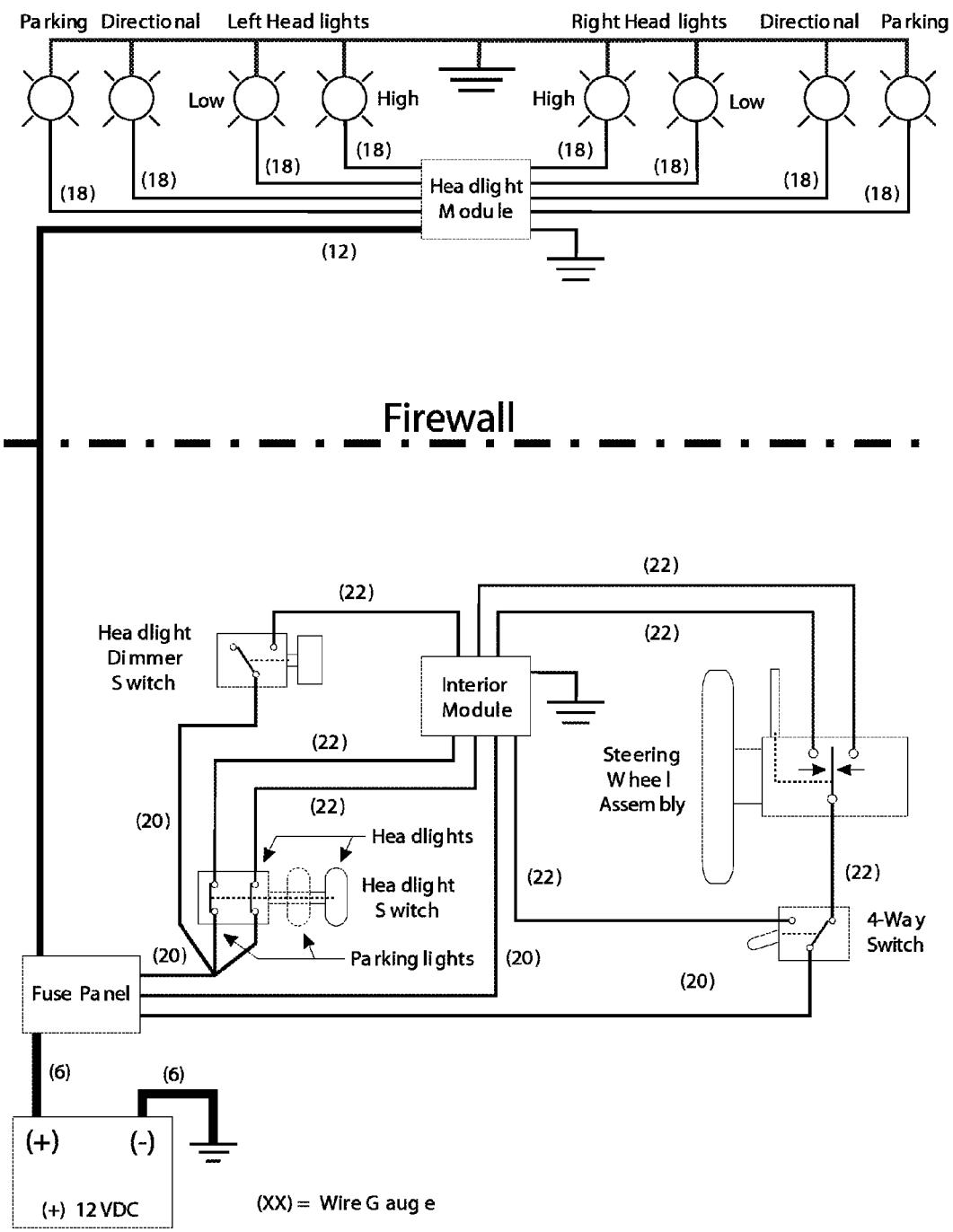
FIG. 9 is a schematic of a vehicle of the present invention.

Referring now to FIG. 8, a schematic of a prior art vehicle wiring system is shown. Referring to FIG. 9, a schematic of a vehicle of the present invention is shown. As illustrated, this system uses the same controls to activate inputs. The major differences are the gauge of wires required and the number of wires leaving the passenger compartment. The preferred embodiment of the gauges of wires are illustrated in parenthesis.

Figure 10:
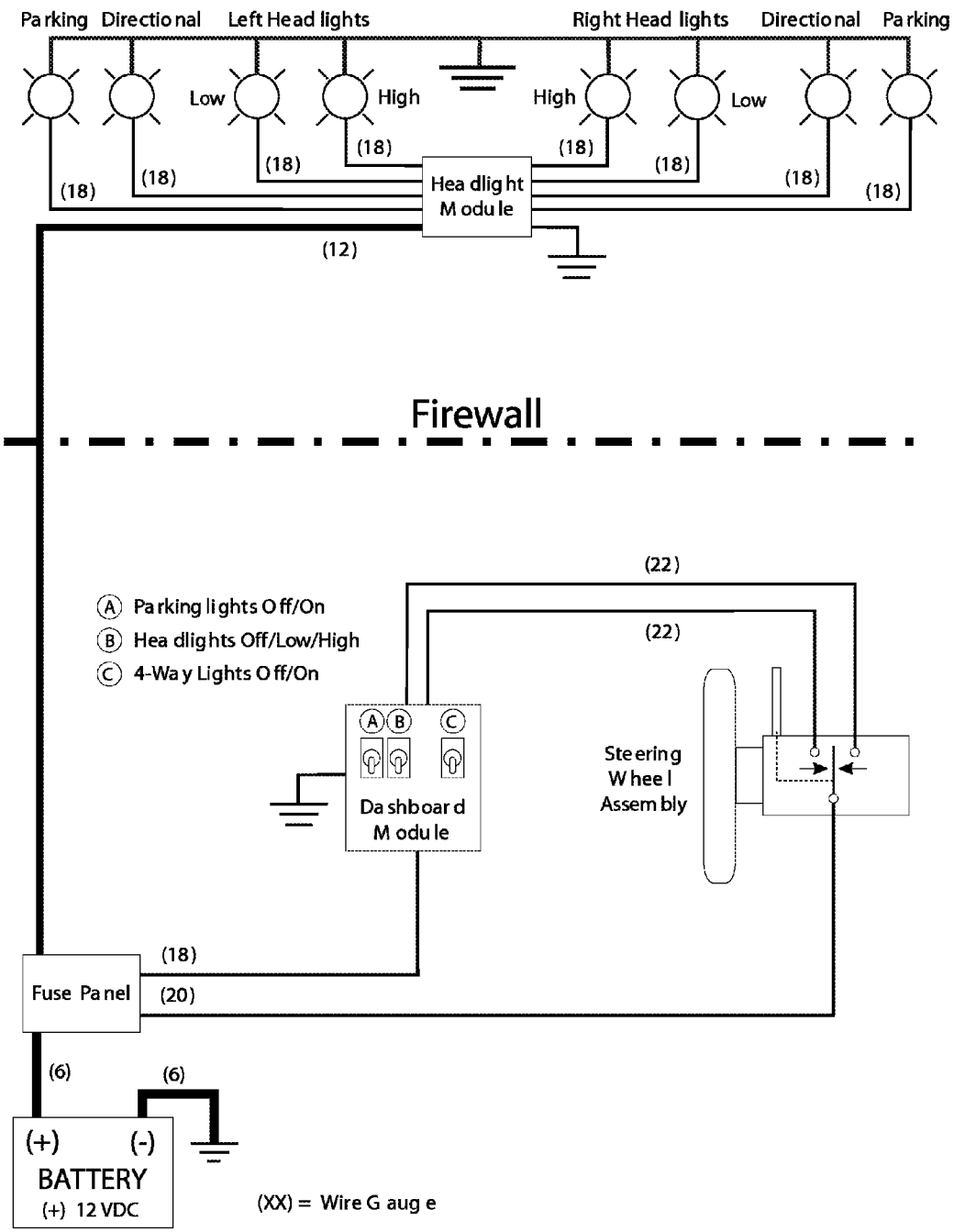
FIG. 10 is a schematic of a vehicle with "standard" controls were replaced with small, low current switches installed on a circuit board of the present invention.

FIG. 10 illustrates replacement of "standard" controls that were replaced with small, low current switches installed on a circuit board.

Figure 11:
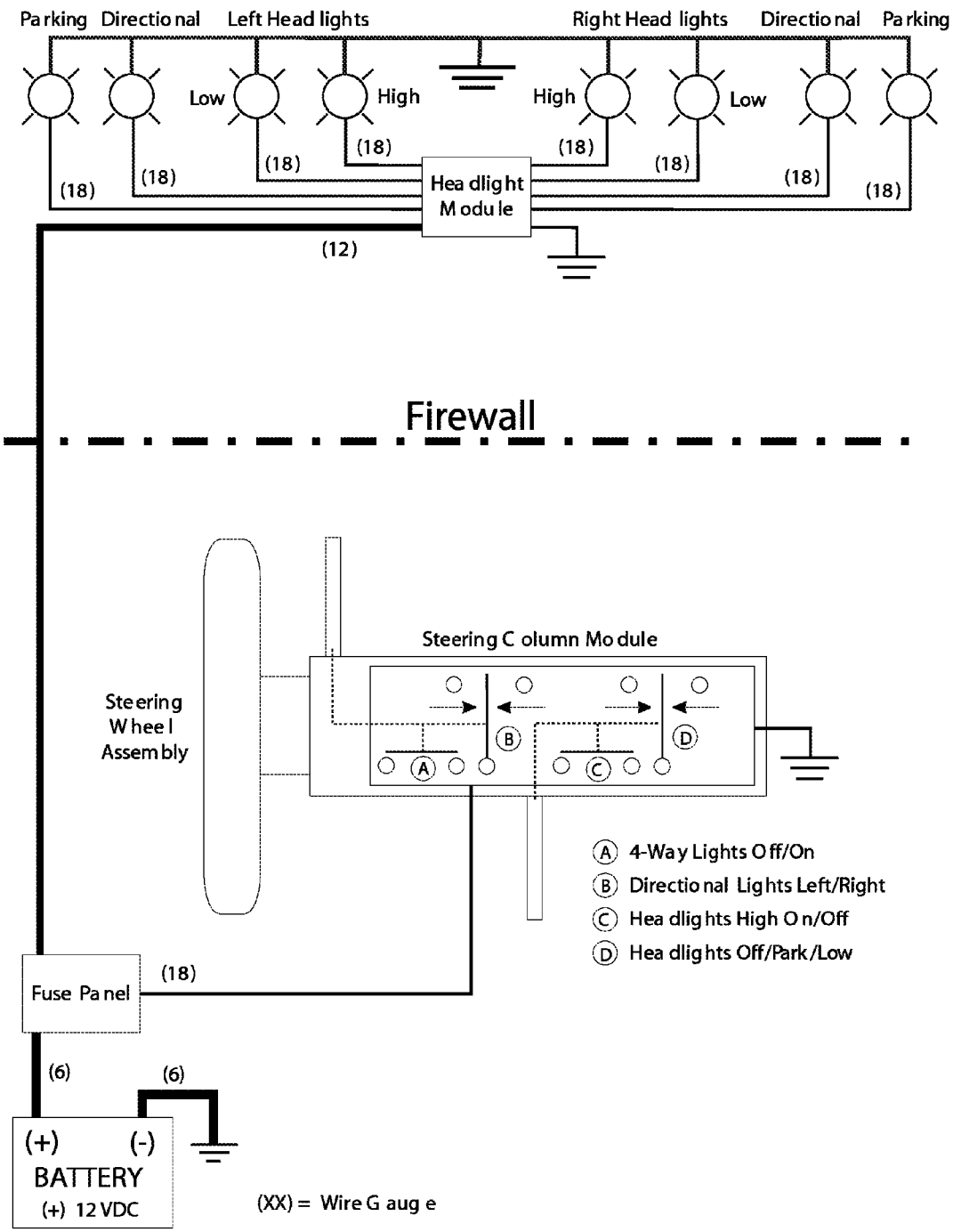
FIG. 11 is a schematic of a vehicle with built in wiring technology of the present invention.
Figure 12:
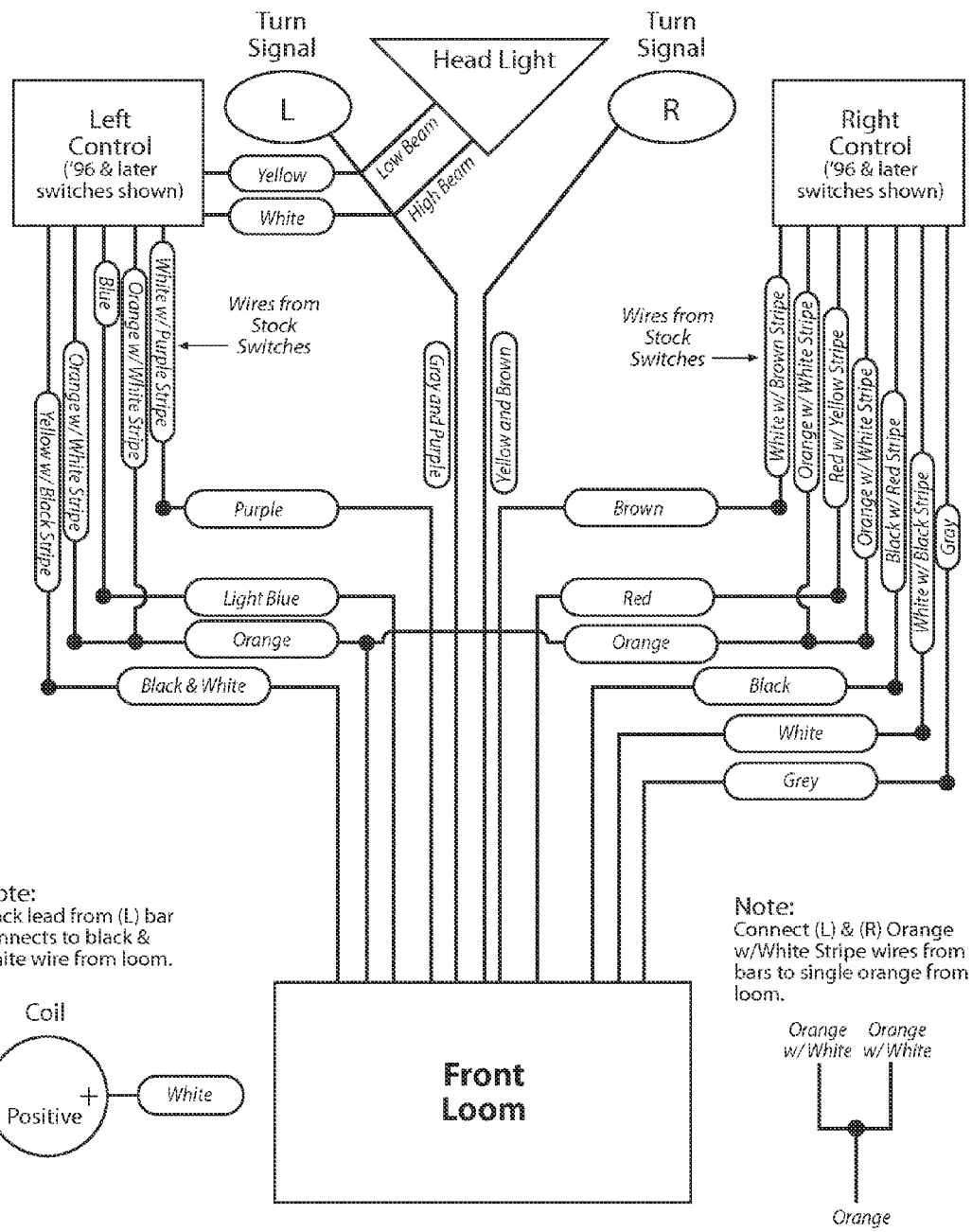
FIG. 12 is a schematic of conventional lighting circuit found in most all factory V-Twin and metric motorcycles.

FIG. 11 shows just how simple the system could get if equipment was designed with the wiring systems and methods of the present invention incorporated.

Referring now to FIG. 14 a conventional lighting circuit found in most all factory V-Twin and metric motorcycles is shown. In contrast, referring now to FIG. 15, the present invention applied on a Peer-to-Peer basis to simplify and eliminate 850 of the wires used in the conventional wiring setup is shown.

Figure 14B:
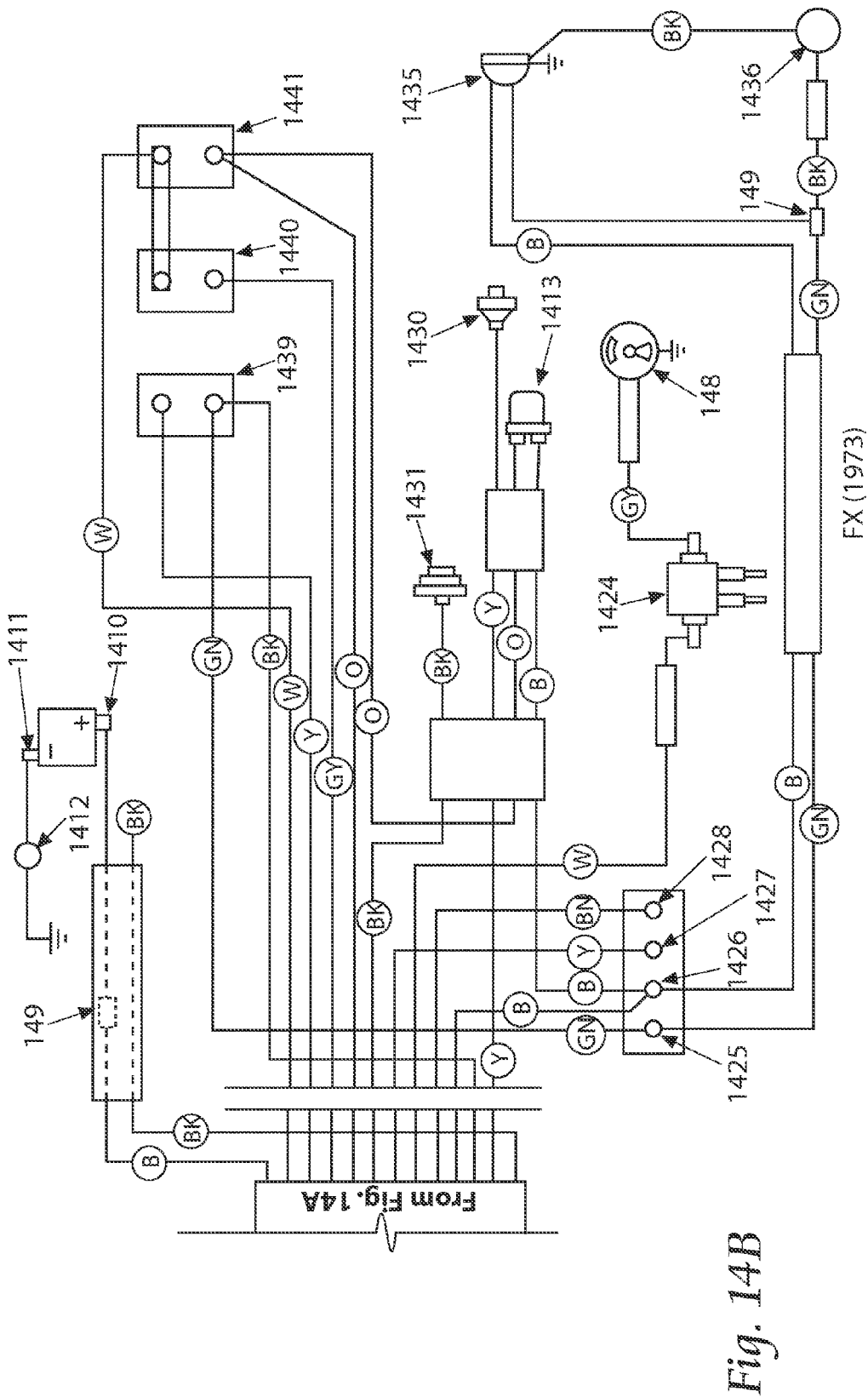

Referring to FIGS. 14*a* and 14*b*, in conventional wiring for v-twin and metric motorcycles, the following are provided, as shown: fork terminal board terminals 1401 to 1405, headlamp beam switch 1406, horn switch 1407, ignition breaker (timer) 1408, wire connector 1409, battery positive terminal 1410, battery negative terminal 1411, frame lug bolt 1412, stop lamp switch—rear 1413, switch "l" lights terminal 1414, switch "i" ignition terminal 1415, switch "b" battery terminal 1416, regulator—rectifier module 1417, alternator to module connector plug 1418, alternator stator 1419, horn 420, headlamp 1421, engine stop switch 1422, stop lamp switch—front 1423, ignition coil 1424, rear terminal board terminal—top 1425, rear terminal board terminal 1426, rear terminal board terminal 1427, rear terminal board terminal—bottom 1428, speedometer light 1429, oil pressure signal switch 1430, neutral switch 1431, neutral indicator lights 1432, oil signal lamp 1433, high beam indicator lamp 1434, tail and stop lamp 1425, license lamp 1436, right handlebar 1437, left handlebar 1438, lighting circuit breaker 1439, ignition circuit breaker 1440, accessories circuit breaker 1441, switch 1442.

Figure 15A:
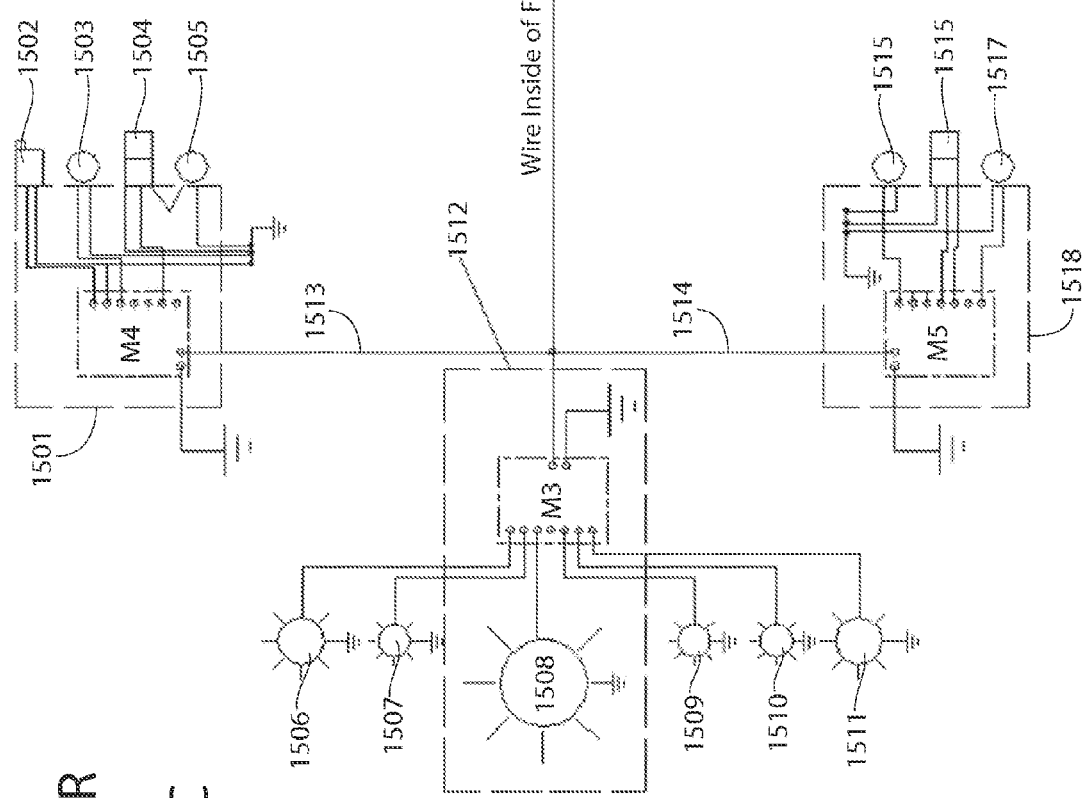
Figure 15B:
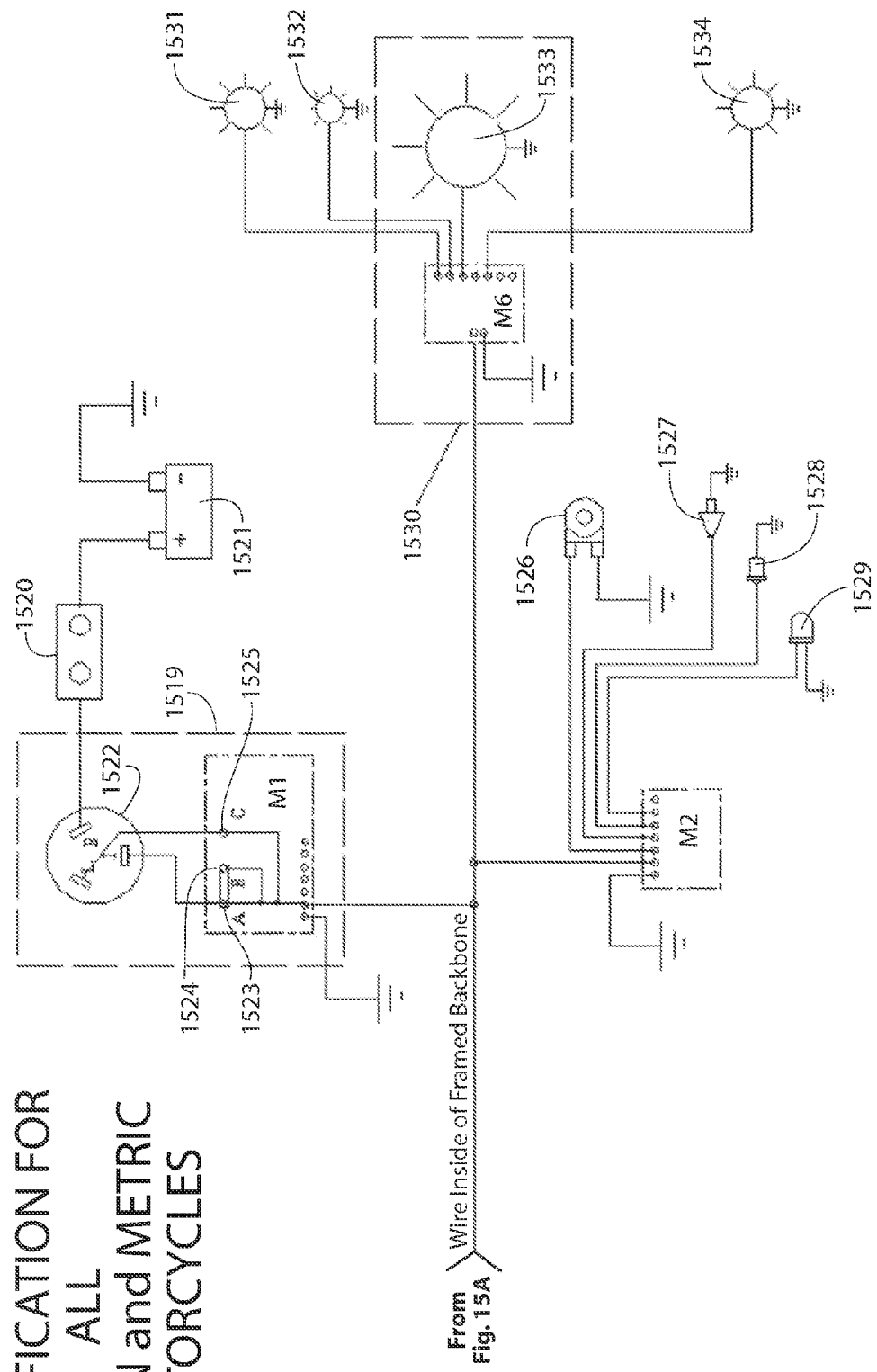

Referring now to FIGS. 15*a* and 15*b*, circuit simplification for v-twin and metric motorcycles such as those of FIG. 14 is shown, between the following elements: right hand control housing 1501, stop light switch 1502, right turn button 1503, kill switch 1504, starter button 1505, through module M4, with a wire inside of right handlebar 1513, right turn light 1506, oil pressure light 1507, headlight 1508, high beam indicator 1509, neutral light 1510, left turn light 1511, through module M3, left hand control housing 1518, left turn button 1517, high low switch 1516, and horn button 1515, through module M5 and wire inside of left handlebar 1514, battery 1521, main breaker 1520, ignition assembly 1519, containing ignition switch 1522, acceleration breaker 1523, ignition breaker 1524, light breaker 1525, all through module M1, taillight assembly 1530, containing tail light 1533, left turn light 1534, license plate light 1532, and right turn light 1531, all through module M6, and horn 1526, oil pressure switch 1527, neutral switch 1528, real brake light switch 1529, all through module M2.

As can be seen, the system can be applied to all motorcycles with a lighting circuit. It is fully customizable, is a self diagnostic system, and LED flashers are supplied for fault codes. The simplicity of the present system significantly reduces the man-hours of wire installation, reduce the number of possible failure points throughout the system, and a user can easily add accessories by tapping into the system power buss. There are many possibilities in light sequences or flashing without the use of separate flasher modules, and additionally, troubleshooting times can be reduced.

Figure 13:
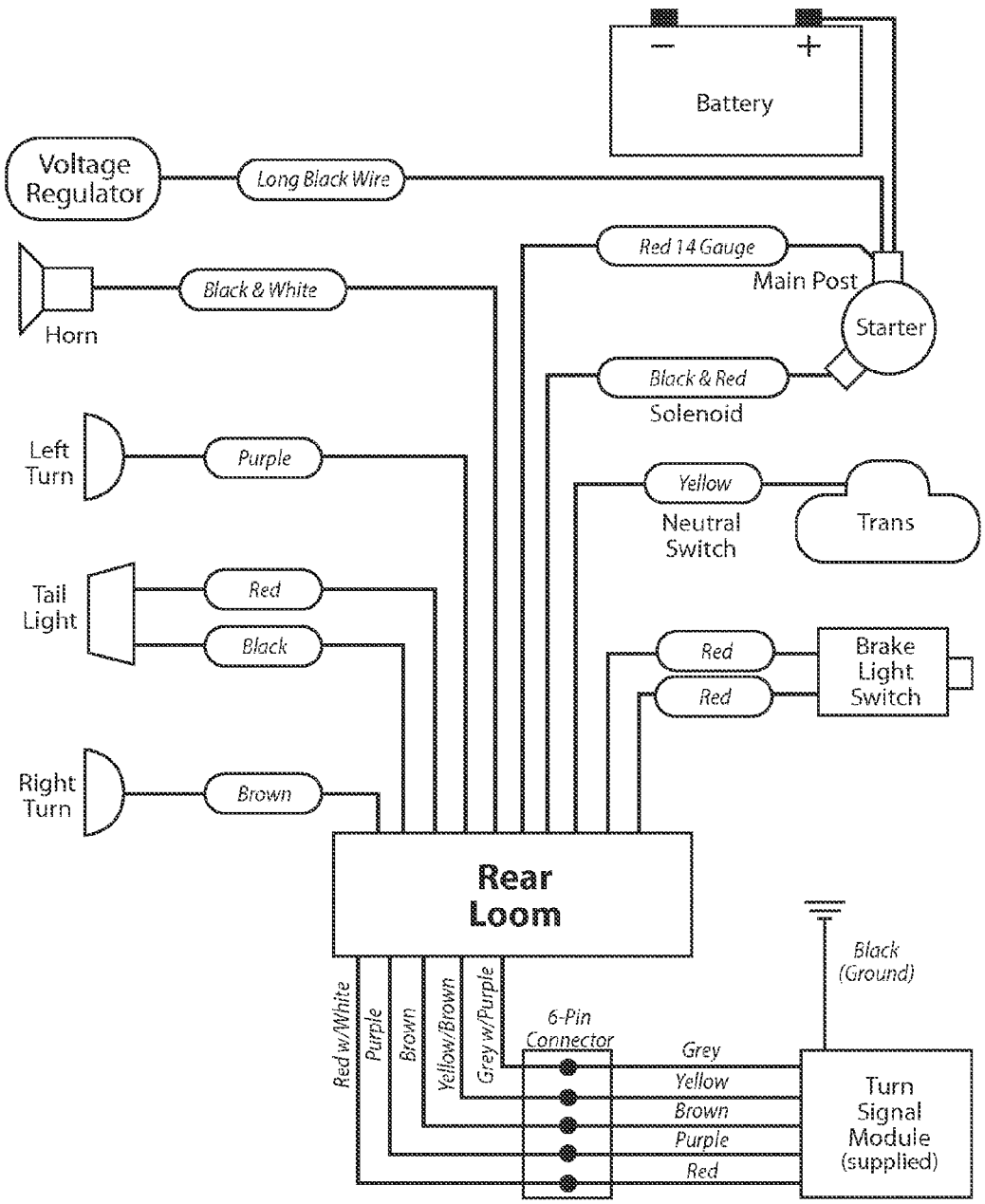
FIG. 13 is a schematic of a wiring system of the present invention applied to a motorcycle.

FIG. 13 is a schematic of a wiring system of the present invention applied to a motorcycle.

FIGS. 14 and 15 are schematic wiring diagrams of a prior art wiring system as applied to a motorcycle and the wiring method of the present invention as applied to a motorcycle, respectively.

Figure 16:
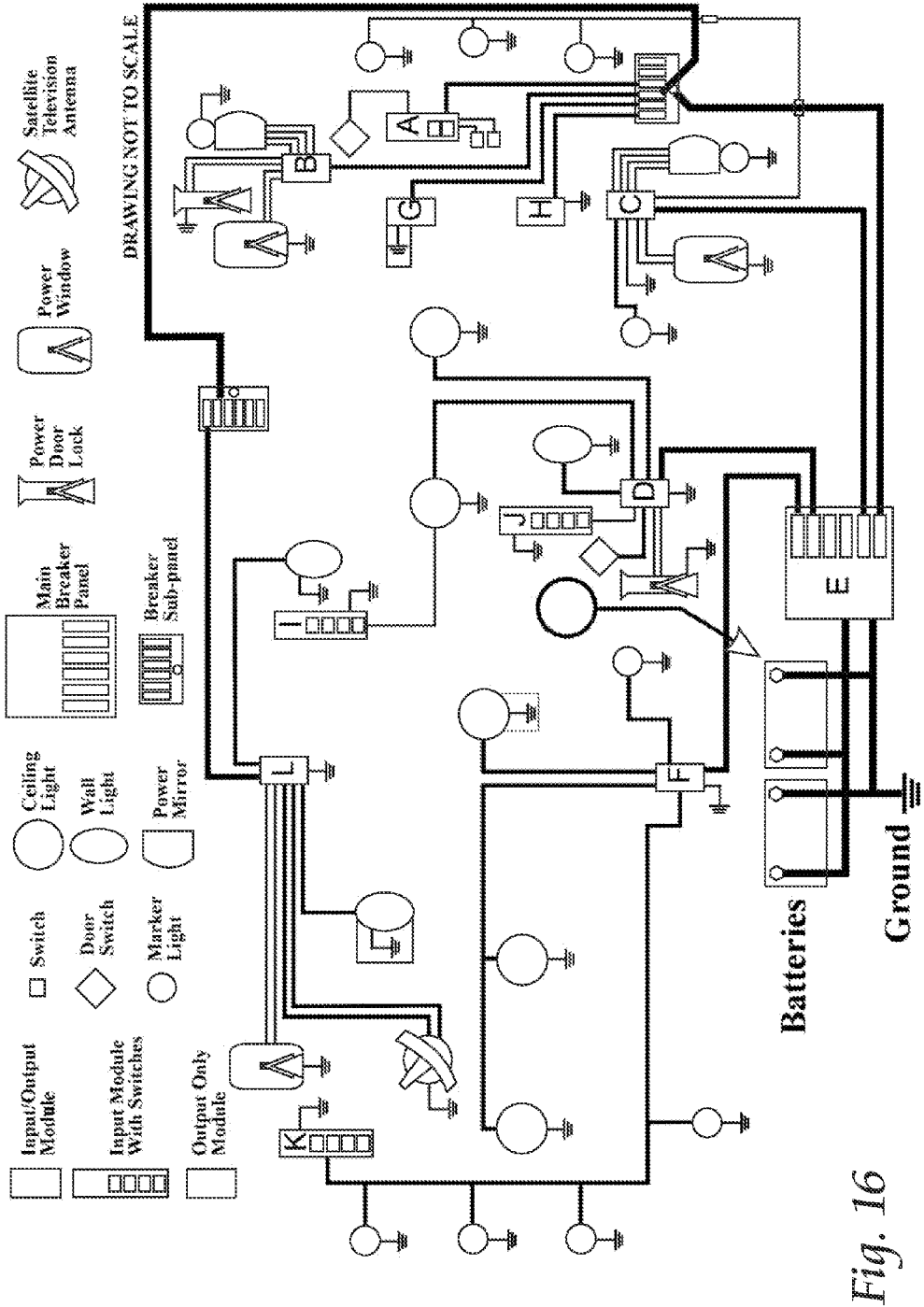
FIG. 16 is a schematic wiring diagram of the wiring method of the present invention as applied to a motorhome or a yacht.

FIG. 16 is a schematic wiring diagram of the wiring method of the present invention as applied to a motorhome or a yacht.

Figure 17:
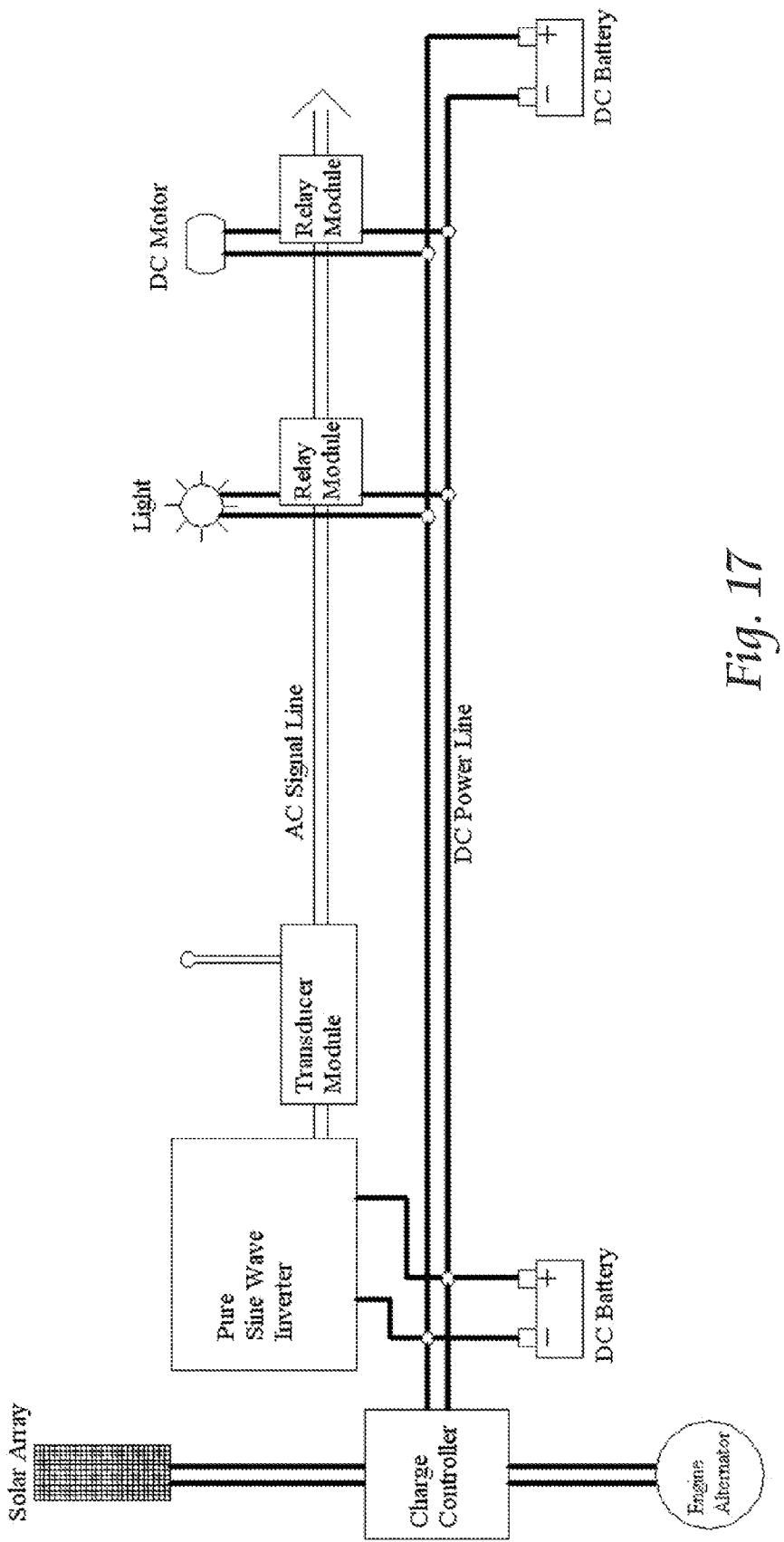
FIG. 17 is a schematic wiring diagram of the wiring method of the present invention as applied to a motorhome or a yacht.

FIG. 17 is a schematic wiring diagram of the wiring method of the present invention as applied to a motorhome or a yacht.

Specialty Truck:

Municipal: Switch inputs, indicators, and joysticks for controlling snow plows, salt spreaders, augers, lift mechanisms, and specialty lighting including strobes & emergency lights may be installed. The advantages over existing systems are: reduced installation time, significantly smaller in size (cab space), simplified trouble shooting, increased control capability, and improved performance.

Forestry Equipment:

Logging: The described systems and methods are well-suited for installation on vehicles and equipment used in processing lumber and log-handling. The typical wire harnesses used to operate the various mechanisms are very complex and can be difficult to troubleshoot. The systems and methods of the present invention reduce cost, simplify wiring requirements, improve system reliability, and increase operator control.

Agriculture:

The systems and methods of the present invention can be used to control the application of fertilizers and weed control liquids, hydraulics, pneumatics, pumps, seed dispensing equipment, and crop harvesting devices. With simplified wiring systems, equipment dealers can install the systems and methods of the present invention at the factory or at the dealership. Troubleshooting is greatly simplified with primary checkpoints at the controls and the modules.

Redundant System Applications:

The systems and methods of the present invention can be installed in addition to existing systems and used as a primary or backup in applications such as:

Aviation:

The simplicity and size (weight) of the systems and methods of the present invention provide a primary or backup electrical system for controls and indicators. By connecting to the system bus, the systems and methods of the present invention can be installed with existing systems and utilized as necessary. The reliability and lightweight components of the systems and methods of the present invention provide distinct advantages over conventional systems.

Recreational Vehicles:

As the complexity of a recreational vehicle's electrical system increases, the need to reduce wire harness weight and assembly time becomes more acute. The systems and methods of the present invention are ideally suited to help accomplish these goals. One example would be the use of multiple control panels connected to a power bus running the length of the vehicle. Interior lights and other devices controlled at the front of the vehicle could also be controlled at other locations in the vehicle requiring only the two wires in the power bus.

Marine:

Boats need to be as lightweight as possible to increase top end performance, reduce fuel consumption and increase cargo capacity. If a boat is loaded with features, the systems and methods of the present invention could reduce the number of interconnecting wires by 40% or more. The use of software to mimic complicated switch or relay controls can reduce the overall part count and total system cost.

Mobile Equipment:

Cranes, bulldozers, road graders, and other pieces of equipment that use large banks of electro-hydraulic valves could benefit from a less complex wire harness.

Figure 18:
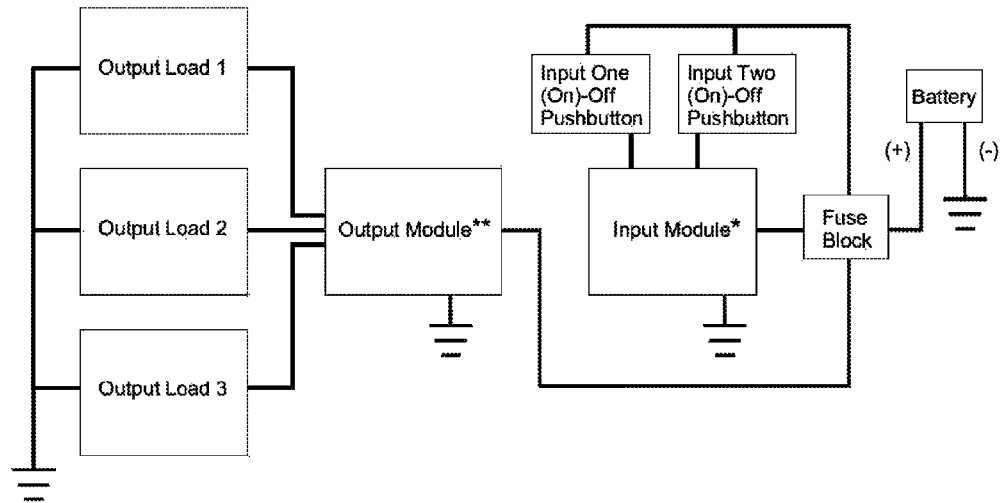
FIG. 18 is a schematic diagram showing a simplified wiring diagram of a conventional prior art system in which both power and command wiring extends between a user interface and a load.

Referring now to FIG. 18, a block diagram showing a simplified concept for the present invention in which power wiring extends between a user interface and a load is shown. Still referring to FIG. 18, Software in the input module could apply control logic to inputs 1 and 2 making them appear to act differently even though they are the same mechanically. Software in the output module could apply control logic to Outputs 1, 2 and 3 allowing the corresponding loads to perform special functions such as pulse width modulation or repetitive on/off power cycling. In this embodiment, a driver command such as Input One or Input Two, could be supplied, such as a hand activated control for police lights contained within a squad car. The power line carries digital messages that contain commands that were generated based on software driven control logic in response to command inputs that control the loads (e.g., the lights on top of the car). Most control systems on the market today attempt to control the activation of a remotely mounted electrical load, such as a light, motor or solenoid, using currently historically proven and accepted methodologies. The result of this approach is often referred to as hardwired logic. Most control methods when analyzed can be divided into specific subsets.

Figure 19:
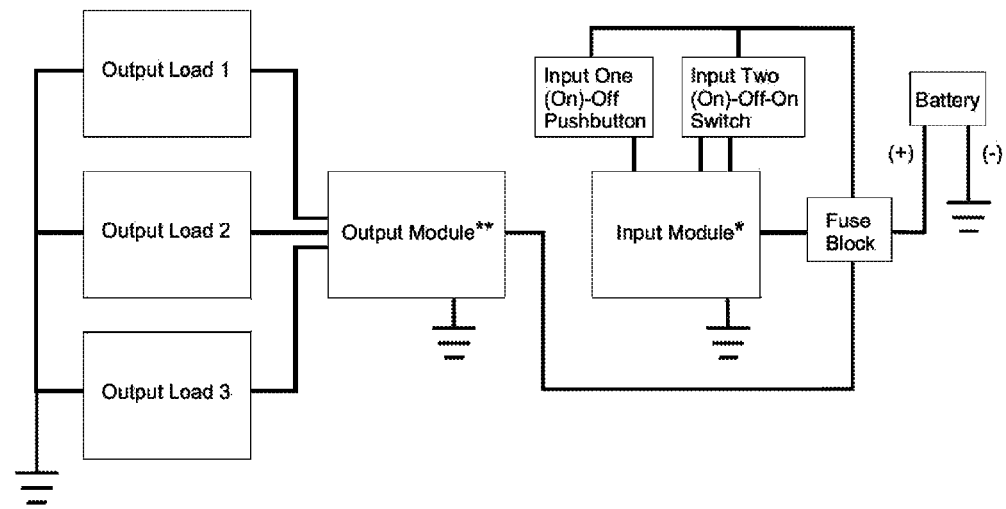
FIG. 19 is a schematic diagram showing a simplified wiring diagram of an embodiment of the present invention, in which power and command wiring extends between a load and a controller/output module, and in which combined power and command wiring can be used between input sources and the output module.

Referring now to FIG. 19, a block diagram showing a simplified wiring concept for an alternate embodiment described below of the present invention is shown. With no control logic software on the input module, each input must be hardwired to create different functions. The input module can only command output modules to route power to specific outputs based on user programmed parameters. With no control logic software on the output module, the output module depends on the input module to tell it which outputs to cycle on or off and when to do it. In this embodiment, a novel router (described later) redefines how the logic portion of the present invention is configured. For instance, as disclosed in U.S. Pat. No. 7,307,520, the system assumes many of the duties for the implementation of the logic requirements for a particular system. The system disclosed therein is a powerful step forward in system design but requires user-defined and hardwired external control logic.

Unique system design considerations include the number of loads, number of inputs, types of inputs, types of loads, and special or timing related functions. For instance, certain police car light bar manufacturers could each have different user-defined emergency light activation sequences.

As shown in FIG. 19, the present invention provides a system capable of providing the benefits of the system disclosed in U.S. Pat. No. 7,307,520 (for instance, a significant reduction in the amount of wiring required for complex electrical applications), and yet provide the flexibility of integration with existing user-defined systems, such as existing preprogrammed police car light bars (loads). As shown in FIG. 19, independent hardwired command logic wiring can be employed at predetermined portions of a wiring system, using the novel combined hardwired logic and power routing capabilities to replace command wiring at different portions of the system, where simplified wiring is desired.

Referring generally to FIGS. 18-21, power routing is normally the first element that most systems have in common. Usually, conductors (wires) of sufficient size to carry the total anticipated electrical load (Amperage) are laid out between the main power supply and a central fuse location or locations. From the central fuse location(s) smaller diameter wires radiate out that can carry a portion of total electrical load. These wires in more conventional systems will directly link to mechanical devices such as switches and/or relays. In newer systems such as that disclosed in U.S. Pat. No. 7,307,520 and incorporated herein by reference, the number of these smaller wires is reduced in favor of an intelligent control module concept (See e.g., FIGS. 5, 7). In this concept the wire layout changes because some of the modules are designed specifically to distribute power to multiple individual loads. As the total load seen by any one of these modules would be larger than any individual load it might control, the power feed wire to these modules must be larger.

Once the power wiring has been considered the next step is usually to consider the logic that will be required to illicit the desired action from the load. In a conventional control system, the logic of the circuit is realized using mechanical devices and discreet interconnecting wires.

In more advanced control systems like that disclosed herein and in U.S. Pat. No. 7,307,520, hardwired logic is augmented by the introduction of software. Software can be written to mimic the actions of devices such as relays, timers and switches. It can also be used to enhance the capabilities of mechanical devices. As an example, a simple momentary "on" pushbutton switch can be manipulated by software to act like the mechanical equivalent of an on/off maintained switch or a selector switch.

The use of software logic also offers the possibility of reduction in the number of wires required to interconnect the various mechanical devices in a hardwired circuit. Specific sections of a specific piece of software logic could be implanted in any intelligent module, offering the designer the ability to divide the logic requirements helping to eliminate interconnecting hardwiring. Using the above example of the pushbutton switch, it would be possible to have one module sense when the switch is closed and a different module actually enact the consequences of that switch closure.

The final major subsection of a typical control system would be the return or ground. All load devices must have a complete path between the power source's (+) and (−) terminals. The return system must consider the amperages of loads when determining the wiring requirements. Unlike the power routing portion of this discussion, the return path would not normally contain any fusing.

In particular, the present invention, and the use of a "Router" concept is based on a limited use of software logic to activate load, used in conjunction with long proven conventional hardwiring methods. The "Router" concept is described with reference to the main input module and output module system described on FIG. 21.

Software "OR" logic can be used in conjunction with conventional hardwiring methods, which allows multiple inputs to affect user-programmable outputs. As an example; if a user or designer wants a load to respond as if it were being controlled by an on/off maintained switch; then the user or designer must incorporate a mechanical switch that performs in that manner. With the system disclosed in U.S. Pat. No. 7,307,520, a software manipulator could convert an input switch's actions.

Figure 20:
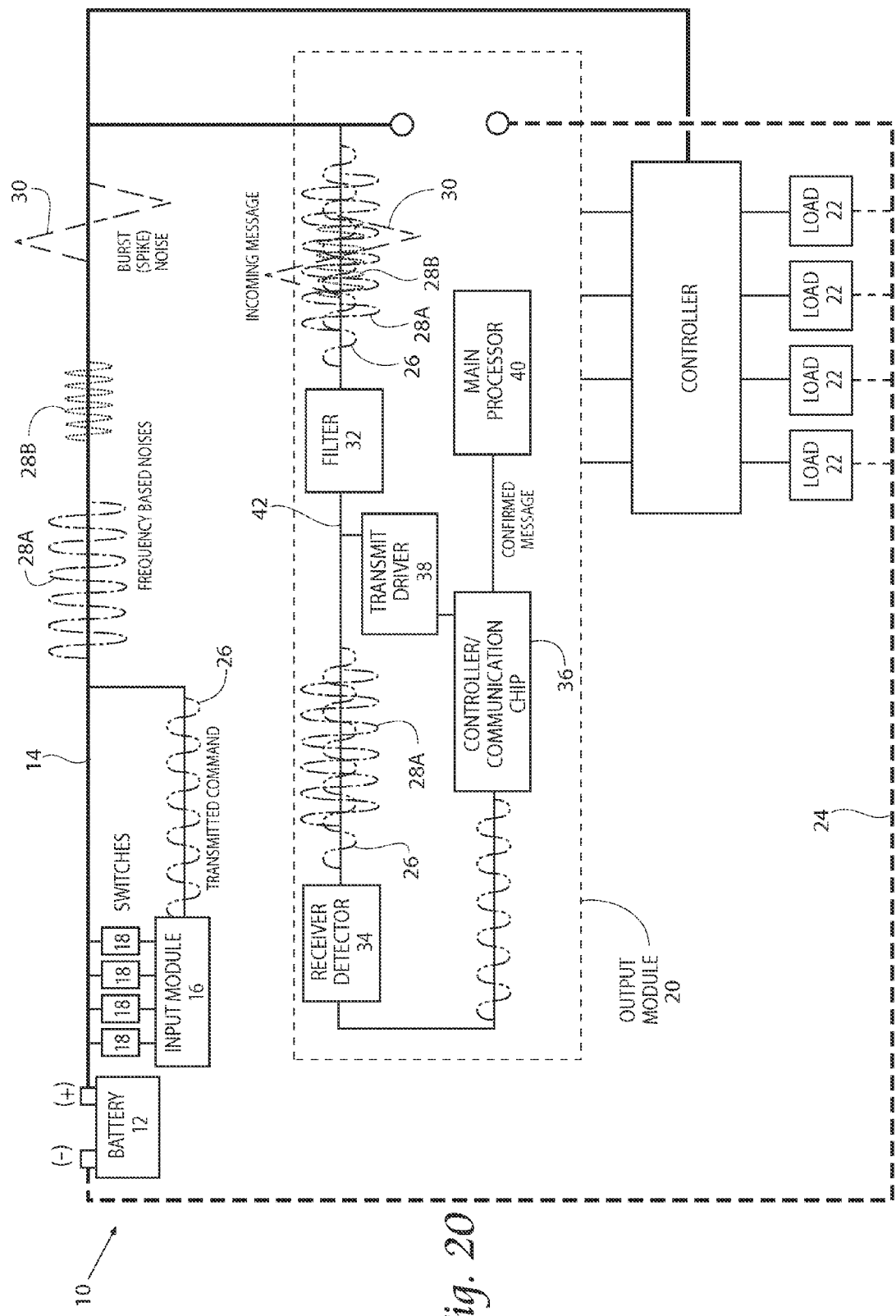
FIG. 20 is a schematic wiring diagram of an alternate embodiment of the present invention, using novel command and power distribution in conjunction with certain existing electrical components.
Figure 21:
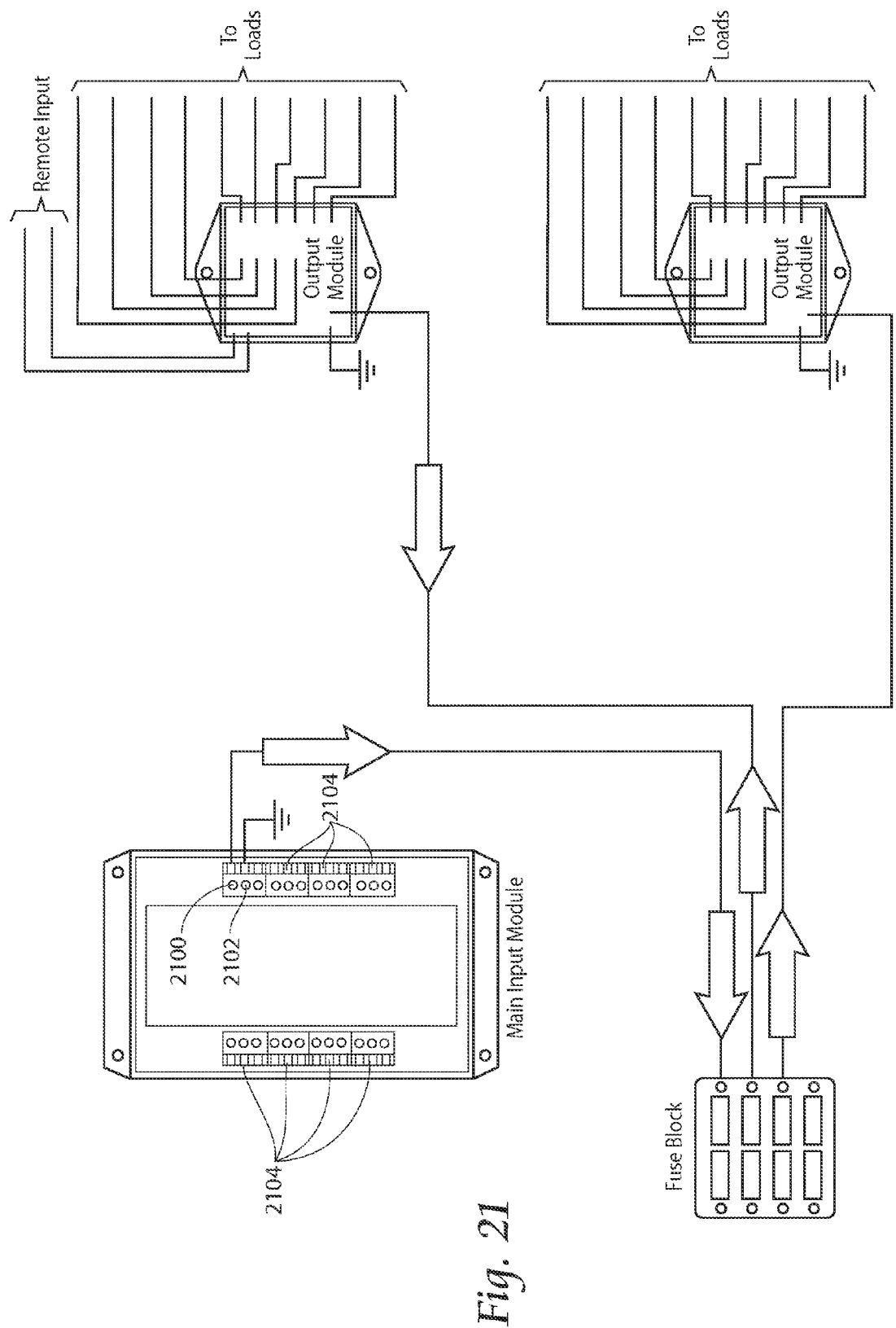
FIG. 21 is a schematic wiring diagram of an alternate embodiment of the present invention.

The "Router" as shown in FIG. 21 is not as much of a control system as it is a data router. The Main Input Module of the Router is programmed to link a specific input with any applicable portion of a customer-generated database. It then broadcasts the results of that compilation to all other modules in the system. Referring still to FIGS. 20 and 21, a schematic wiring diagram of an alternate embodiment of the present invention, such as that of FIG. 19, is shown using novel command and power distribution in conjunction with certain existing electrical components.

As is there shown, the system separates the control logic and distribution functions normally built into a modern electronic control system. This distinction is subtle but important because it changes how a system would be wired. Logic that software could handle when determining if a particular output load wire should activate is relegated to the installer and how the "input" wiring that leads to the Main Module is done. This change offers several advantages such as a lower cost and smaller size for the control, increased flexibility in meeting varying installer needs and a higher probability of being able to meet future requirements. These goals can be reached because the unit's function is simply to route power. When and why power is routed to a particular output is handled by external hardwiring that is determined by the installer.

Referring to the main input module as shown in FIG. 21, a programming section is provided to allow specific inputs to be linked to multiple output load wires. Wires connected to the input terminals are main inputs. They control the load wires from the various output modules and are active when (+)12 VDC is applied. When an input line goes active a digital message is constructed based on the links that were established through the programming section and then broadcast over the power wire using conducted emissions to and through the fuse block. Next, from the fuse block, broadcast messages radiate out through common connections to reach the intended recipients through the output modules. Referring now to FIG. 21, 12 v DC fused element 2100 and ground 2102 are provided, along with inputs 2104.

Two types of output modules can be provided, with or without remote input capabilities. The first type, with remote input capabilities, is shown on the upper right of FIG. 21. Remote inputs can be provided which are active when (+)12VDC is applied. These modules have remote inputs and up to 5 of this style of module can be used in a Router system. The second type, without remote inputs, is shown on the lower right of FIG. 21. These can also be provided and preferably up to 5 of this style of module can be used in a router system.

After an Output Module receives a valid message from the main input module, it will broadcast a return message telling the Main Module if there are any output errors and if either of the two remote input lines are active (if equipped with remote inputs). Also, the output modules will transmit the appropriate power and command sequences to first the controller (See FIG. 19) and eventually to the various electrical loads. Preferably, every Output Module has a factory assigned unique ID number so it can determine which messages it should react to, when the output modules receive broadcast messages from the main input module.

By installing a Router system of the present invention, older controls that were designed for hardwired systems in their applications can be retained and utilized, yet the wiring of such systems can be greatly simplified. Further, the systems of the present invention can be used to interface, control and power pre-existing systems, such as Whelen and Code 3 police car light bar manufacturers.

The Router, for example, can toggle the power feed to an already designed police car light bar without having to worry about interfacing with the feature setting or synchronization circuits already designed into the unit. As another example, the Router of the present invention can be used with flasher modules on police car light bars to supply a signal to the flasher to activate its internal flasher sequence. The main power feed to the flasher module (20 Amp) can be supplied to the unit through a separate terminal. The modules can be designed to supply two different timing sequences, which would relieve the Router of that responsibility.

Another feature of the present invention is the possibility to develop new modules that could be installed on the input side of the Router. Modules can be developed that would allow an installer to change the action of mechanical switches, add timing features or even have outputs that are controlled by a temperature sensing module. For instance, in one exemplary embodiment, a road salting sequence can be provided for municipal vehicles. If salt is not supposed to be supplied on the road if the temperature were above or below certain points, a Router input terminal could be connected to a temperature-sensing module and would not provide power to any manufacturers salt controller until the temperature was in the correct range.

To program a Router unit, there are preferably seven switches that control the programming process. Two of the switches are simple on/off devices. One of the switches is turned on when you want to program a unit and it supplies power to all of the other switches. It also sends a signal to the microprocessor when it is active. The other switch is used to tell the microprocessor when you are programming one of the remote input lines.

Also provided are three 16 position hexadecimal (hex) switches. This type of switch has the ability of toggle 4 separate electrical signal lines at one time. This results in 16 different on or off combinations of the 4 signal lines that the processor is programmed to interpret and act upon. These switches are used for two purposes.

Two of the switches are used together to tell the microprocessor the number of the input terminal you wish to program. One switch takes care of inputs between 1 and 10. The second switch covers inputs 11 to 19. There is error detection software built into the Router that can tell when both of the switches are set to some value other than zero at the same time. This would be an illegal entry so the "input error" light would illuminate. The 1/10 input switch would also be used to indicate which remote input was being programmed. Error detection looks for when the remote input switch described in the previous paragraph is active. When it is active it considers any input setting other than zero from the 11/19 switch as an illegal entry and would again illuminate the input error light.

The remaining hex switch is used to tell the processor which output module you wish the input to be linked with. This input is limited to settings between 1 and 10. Any setting above ten would be considered an illegal entry and the "output error" light would warn you of an incorrect setting. Also, if you had the output switch set to any number other than zero, but both input switches were set to zero that would be another illegal entry and the output error light would come on.

In addition, setting either of the input switches to a non-zero value while the output switch is set to zero is considered an illegal entry and the output error light will notify you of that situation.

When in the programming mode the error lights will not come on until the "enter" switch is pushed.

The next switch to discuss is a 10-pole dipswitch. This is a very small switch package that has ten individual actuators built into it. The actuators directly correspond to the ten output load lines that each output module has. So switch actuator one on the dipswitch corresponds to output load line one and so on down the line. Setting a dip switch actuator to the "on" position tells the microprocessor that you want that output line to turn on when the input line it is linked to it becomes active. Leaving an actuator in the "off" position means the specified line will remain off when the linked input goes active.

The final programming switch is a momentary "on" pushbutton used to enter or "set" the information you have selected into memory. This information goes into a type of memory inside the processor known as EEPROM, so that the information will not be lost when power is removed from the Router. Because EEPROM is read/write limited, it is possible that memory could degrade after a significant number of read/write cycles. If this occurs, the information can be moved from EEPROM to SRAM memory under specific circumstances, because SRAM memory has unlimited read/write capabilities. It is noted however that if power is removed from the Router all information in the SRAM may be lost.

Figure 22:
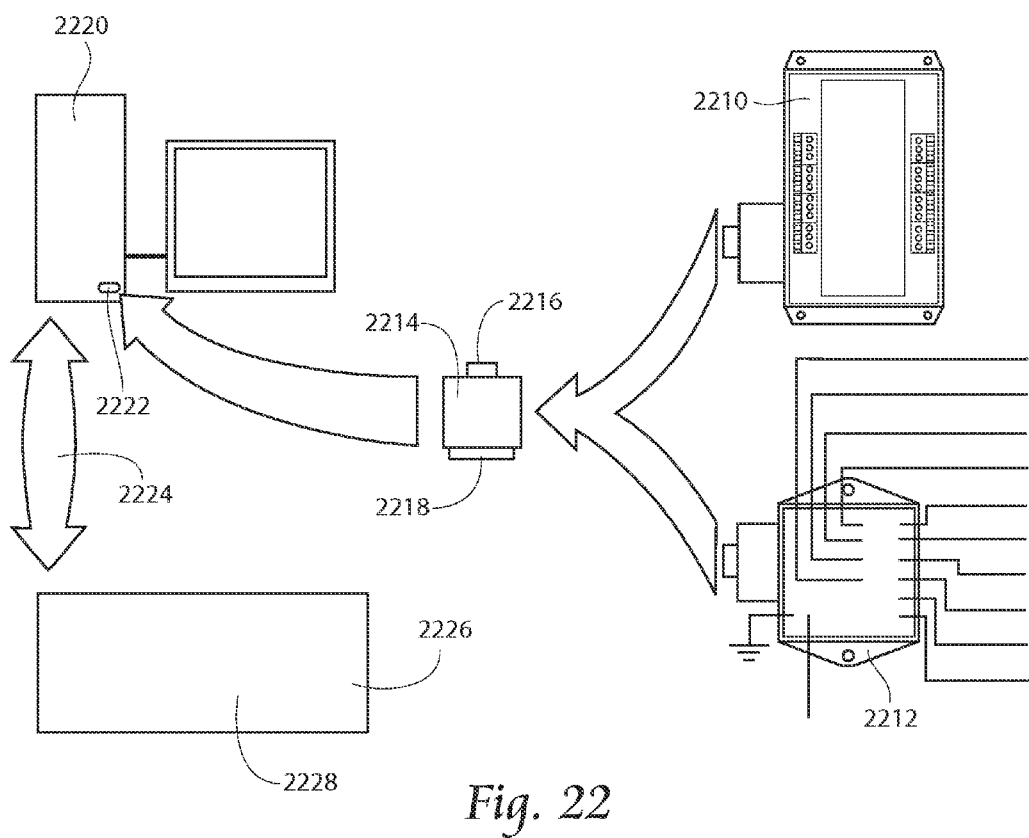
FIG. 22 is a schematic diagram of a remote location programming enabled device to generate actual programming code based on customer requirements and storage for customer generated programs of the present invention.

Another alternative to programming the router system utilizes the "Zcloud" Internet technology. This would enable the programmer to use a graphic user interface (GUI) available on the router website to customize the router. To minimize the software pirating potential, Zcloud would be limited to modifying and downloading only a portion of the router program. A major part of the program would be pre-installed, be the same for all units and would not be accessible by any customer. Referring now to FIG. 22, input module assembly 2210 is provided, as is output module assembly 2212, core microprocessor, memory and communications module (logic module) 2214, USB connector 2216, which plugs into input or output modules when logic module 2214 is in use. Mini or micro pin connector 2218 which connects logic module 2214 with input or output modules 2210 and 2212, and computer 2220, with associated monitor, keyboard and mouse/pointer is provided with USB port 2222 through which logic module 2214 is provided, connected by internet connection 2224 to a server 2226 that a customer could call into to program the logic module 2214, the server 2226 containing a program that would send the customer GUI screens for programming, generate the actual programming code based on customer requires and storage for customer generated programs.

Whenever the Router is powered up it is programmed to go into the EEPROM memory and copy all information concerning the customer-programmed settings into SRAM. When the transfer is complete a marker is activated that tells the program that the EEPROM memory has been read and the action should not be repeated. This marker will remain as long as power is not removed from the Router.

Customer settings are then in SRAM and the microprocessor can begin processing the information. The EEPROM customer information is stored in 29 distinct blocks. Each block is linked to a specific input number as there are 19 main inputs and 10 remote inputs. Each block consists of ten full registers and three partial registers containing the information for each of the 10 output modules that an input can control. A register is one Byte long, which means it contains eight Bits of potential information. Each Bit represents one output module load line. A zero Bit means leave that specific output load line off and a one means turn the output on.

Because there are 10 output load lines for each output module, one register cannot contain all the required information. To overcome this, when the unit is in programming mode, information is packed for the last two outputs of four different output modules into one register. If an entire register had been wasted storing only two Bits of information for each module an additional 261 registers would have been required.

This scenario, although necessary, increased the complexity of the program. The program now had to store and accurately retrieve two Bits of information connected to a specific output module from 18 bits of information stored in the partial registers in each block.

When a specific input is active the block of information associated with that input is scanned and all information for the Output Modules are copied to one of twenty working registers. Two working registers are assigned to each Output Module, because there are preferably ten output load lines per module and eight Bits of information in a register are stored. These registers combine all the information from any active input concerning a particular Output Module.

The Router gives the customer to use any of the available inputs to control any of the output load lines in any Output Module. Information from any active input is scanned, segregated and compiled. The working registers do the compilation by adding together the active outputs being requested by any active input related to a specific Output Module.

Once the compilation is completed a working register transfers its information to a transmit register, to have a buffer between the scanning and transmitting functions. Without this buffer the information being transmitted could fluctuate because the transmit function runs independently from the scanning function. The result would be an output that could flicker on and off, which would be unacceptable to the customer.

Once the information is in the transmit register it is further manipulated by the transmit function. Chips such as those manufactured by Yamar can perform error checking and correction on each message transmitted. However, an additional layer of error detection is preferable. What the transmit function does before sending a message is to generate the one's complement of each transmitted register. One's complement is another way of saying when you add to hexadecimal registers together the answer will always be a register containing nothing but ones, or in other words a full register. So, as an example, if you had one register that contained the following eight Bits, 00110011 the one's compliment would have to be 11001100. Notice that each zero Bit in one register is matched with a one Bit in the same Bit position in the opposite register. When these two registers are added together the result would be 11111111. If a data register in a received message does not produce a full register when added to its one's compliment the data is considered corrupted and the message is dumped.

This method of error checking is a simple, quick yet fairly effective way to scan incoming information. It is harder for interference to affect this scheme because it would have to affect two different registers in exactly the right fashion to avoid detection. That is not to say that could not happen but it reduces the odds by adding a higher degree of complexity to the error-checking scheme.

In addition to the four Bytes required when conveying the output information, there are three additional Bytes transmitted with each message. One Byte tells the chip how many Bytes long the message to be sent is. One of the other Bytes identifies the module sending the message based on a predetermined numbering scheme backed up by a Nibble (½ Byte or four Bits) based one's complement error checking scheme. The last Byte identifies which Output Module the message was intended for again backed by the same Nibble checking routine.

In the Output Modules, the software in those modules receive messages, adjust their outputs accordingly, scan for output load line opens or shorts and convey the result of those scans to the Main Module.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A method of transmitting a digital communication comprising:
    powering an input module and a first output module with direct current (DC) electrical power provided on at least one DC system power line;
    receiving an input signal at the input module from an input source;
    transmitting a serial command code based on the input signal, the serial command code being transmitted from the input module over the at least one DC system power line to the first output module, the DC electrical power being present on the at least one DC system power line during this transmitting step;
    processing the serial command code at the first output module;
    activating a load line from the first output module to a first load as a result of the processing step.

2. A method according to claim 1, wherein the DC electrical power is provided by a battery.

3. A method according to claim 1, wherein the output module is programmable.

4. A method according to claim 1, wherein the input module is programmable.

5. A method according to claim 4, wherein the input module comprises a plurality of inputs and a plurality of outputs, the input module being programmable to link any of the plurality of inputs to any of a plurality of outputs.

6. A method according to claim 4, wherein the input module comprises a plurality of inputs and a plurality of outputs, the input module being programmable to link one of a plurality of inputs to more than one of the plurality of outputs.

7. A method according to claim 1, further comprising the step of transmitting the serial command code from the input module over the at least one DC system power line to a second output module.

8. A method according to claim 7, further comprising the step of processing the serial code at the second output module.

9. A method according to claim 8, further comprising the step of activating a second load line from the second output module as a result of the second output module processing step.

10. A method according to claim 7, wherein the input module is programmable.

11. A method according to claim 10, further comprising the step of using a graphic user interface on a website to program the input module.

12. A method according to claim 1, further comprising the step of activating a second load line from the first output module as a result of the first output module processing step.

* * * * *